US012605925B2

(12) United States Patent
Brown et al.

(10) Patent No.: US 12,605,925 B2
(45) Date of Patent: Apr. 21, 2026

(54) MULTI-LAYER LAMINATES AND METHODS OF MAKING THE SAME

(71) Applicant: Bemis Associates, Inc., Shirley, MA (US)

(72) Inventors: Richard A. Brown, Danville, NH (US); Jared M. Ide, Chicago, IL (US); Daryl R. Johnson, Fitchburg, MA (US); Dylan T. Smith, Athol, MA (US); Stephen A. Topper, Barre, MA (US)

(73) Assignee: Bemis Associates, Inc., Shirley, MA (US)

( * ) Notice: Subject to any disclaimer, the term of this patent is extended or adjusted under 35 U.S.C. 154(b) by 215 days.

(21) Appl. No.: 18/114,206

(22) Filed: Feb. 24, 2023

(65) Prior Publication Data

US 2023/0286258 A1     Sep. 14, 2023

Related U.S. Application Data

(60) Provisional application No. 63/314,238, filed on Feb. 25, 2022.

(51) Int. Cl.
| | |
|---|---|
| *B32B 7/06* | (2019.01) |
| *B32B 7/12* | (2006.01) |
| *B32B 27/12* | (2006.01) |
| *B32B 27/28* | (2006.01) |
| *B32B 27/40* | (2006.01) |
| *B32B 37/00* | (2006.01) |
| *B32B 37/12* | (2006.01) |
| *B32B 38/00* | (2006.01) |

(52) U.S. Cl.
CPC ............ *B32B 37/1207* (2013.01); *B32B 7/06* (2013.01); *B32B 7/12* (2013.01); *B32B 27/12* (2013.01); *B32B 27/285* (2013.01); *B32B 27/40* (2013.01); *B32B 37/025* (2013.01); *B32B 38/0004* (2013.01); *B32B 2255/26* (2013.01); *B32B 2307/7376* (2023.05)

(58) Field of Classification Search
CPC ........................ H05K 3/361; B32B 2255/12; B32B 2255/26; B32B 2270/00; B32B 2307/308; B32B 2307/70; B32B 2307/7376; B32B 2307/748; B32B 27/08; B32B 27/10; B32B 27/12; B32B 27/20; B32B 27/285; B32B 27/36; B32B 27/40; B32B 37/025; B32B 37/1207; B32B 38/0004; B32B 7/02; B32B 7/06; B32B 7/12

See application file for complete search history.

(56) References Cited

U.S. PATENT DOCUMENTS

| | | | |
|---|---|---|---|
| 4,269,885 | A | 5/1981 | Mahn |
| 4,717,621 | A | 1/1988 | So et al. |
| 5,073,423 | A | 12/1991 | Johnson et al. |
| 5,312,645 | A | 5/1994 | Dressler |

(Continued)

FOREIGN PATENT DOCUMENTS

WO      2023-164182 A1      8/2023

OTHER PUBLICATIONS

International Search Report for International Application No. PCT/US2023/013892 mailed Jun. 15, 2023.

*Primary Examiner* — Lawrence D Ferguson
(74) *Attorney, Agent, or Firm* — Morse, Barnes-Brown & Pendleton, P.C.; Sean D. Detweiler, Esq.

(57) ABSTRACT

Disclosed herein are improved multi-layer laminates for decals or embellishments for clothing, e.g., lettering for athletic wear, and methods of producing the same.

12 Claims, 23 Drawing Sheets

(56)                    References Cited

U.S. PATENT DOCUMENTS

| 5,338,603 | A | 8/1994 | Mahn, Sr. et al. |
|---|---|---|---|
| 5,411,783 | A | 5/1995 | Mahn, Jr. |
| 6,143,115 | A | 11/2000 | Sammis |
| 6,361,855 | B2 | 3/2002 | Mahn, Jr. et al. |
| 6,824,849 | B2 | 11/2004 | Herzog et al. |
| 7,361,403 | B1 | 4/2008 | Lowe |
| 7,589,148 | B2 | 9/2009 | Dorr et al. |
| 7,807,246 | B2 | 10/2010 | Truog et al. |
| 8,172,975 | B2 | 5/2012 | Chamandy |
| 8,334,030 | B2 | 12/2012 | Williams |
| 8,507,616 | B2 | 8/2013 | Yang et al. |
| 8,613,988 | B2 | 12/2013 | Williams |
| 9,180,728 | B2 | 11/2015 | Abrams |
| 9,227,461 | B2 | 1/2016 | Williams |
| 9,404,020 | B2 | 8/2016 | Grablowitz et al. |
| 9,718,295 | B2 | 8/2017 | Williams |
| 10,586,472 | B2 | 3/2020 | Lux et al. |
| 2001/0036536 | A1 | 11/2001 | Mahn et al. |
| 2009/0280290 | A1 | 11/2009 | Weedlun |
| 2011/0045306 | A1 | 2/2011 | Johnson et al. |
| 2011/0053450 | A1 | 3/2011 | Baqai et al. |
| 2016/0318289 | A1 | 11/2016 | Bünger et al. |
| 2017/0107398 | A1 | 4/2017 | Ho et al. |
| 2019/0153267 | A1 | 5/2019 | Munnelly et al. |
| 2020/0307155 | A1 | 10/2020 | Yasui et al. |

MULTI-LAYER LAMINATES AND METHODS OF MAKING THE SAME

RELATED APPLICATIONS

This application claims the benefit of U.S. Provisional Application No. 63/314,238, filed Feb. 25, 2022, the teachings of which are incorporated herein by reference.

BACKGROUND

The lettering applied to athletic wear shirts and jerseys can be applied by various means including screen printing and hot melt "vinyl" decals also known as "Heat Transfer Vinyl". The generic term "vinyl" covers any class of polymer film including, but not limited to, PVC, EVA, and polyurethane. One drawback with these materials is that they are generally thicker and not very flexible which contrasts with the current trend in athletic wear towards lightweight, flexible and breathable materials.

Another available technology is "Heat Transfer Printing" which is the technology used to make "Tag-less labels". This technology allows for very thin heat transfer, but the resulting product is not very durable. For example, the material will crack and delaminate after repeated washes.

Thus, there continues to be a need for lightweight and low-profile lettering that exhibits good flexibility, and which can be readily hot melt applied and can survive multiples washes.

SUMMARY

The products described herein exhibit improved durability, e.g., they do not delaminate during repeated washes, as compared to products produced using screen printing or heat transfer printing. In addition, due to the softness and stretch of the material, the products do not exhibit cracking after repeated washes. Thus, the products described herein exhibit superior performance over those produced using methods known in the art for applying lettering to athletic wear.

Disclosed herein are laminates comprising: a first layer deposited on a release liner, wherein the first layer comprises a polyether or polyester based polyurethane; and a second layer deposited on the first layer, wherein the second layer comprises a polyester or polyether based polyurethane in combination with a blocked or encapsulated isocyanate.

Also disclosed herein are methods of producing a laminate comprising: depositing a first layer onto a release liner, wherein the first layer comprises a polyether or polyester based polyurethane; and depositing a second layer onto the first layer, wherein the second layer comprises a polyether or polyester based polyurethane in combination with a blocked or encapsulated isocyanate.

In some embodiments, the first layer and/or the second layer is dried using hot air drying prior to depositing the second layer onto the first layer. In some embodiments, the methods further comprise cutting the laminate into embellishments. In some embodiments, the methods further comprise bonding the embellishments to a fabric.

Also disclosed herein are methods of producing a decal comprising: forming a laminate comprising: depositing a first layer onto a release liner, wherein the first layer comprises a polyether or polyester based polyurethane; and depositing a second layer onto the first layer, wherein the second layer comprises a polyether or polyester based polyurethane in combination with a blocked or encapsulated isocyanate; cutting the laminate into shapes; and affixing the laminate shapes to a fabric.

In some embodiments, a laminate further comprises a third layer located between the first layer and the second layer. In some embodiments, the laminate is solvent free.

In some embodiments, the release liner comprises one or more polyurethane dispersions, e.g., one or more water-based polyurethane dispersions. In some embodiments, the release liner comprises a matt texture. In some embodiments the release liner comprises a silicone coated paper. In some embodiments, the release liner comprises polyethylene terephthalate.

In some embodiments, the first layer comprises a pigment. In one embodiment, the first layer comprises a polyether based polyurethane. In one embodiment, the first layer comprises a polyester based polyurethane. In some embodiments, the first layer exhibits a high melt temperature. In some embodiments, the first layer comprises Impranil DL 1554 or DL 1069.

In some embodiments, the second layer comprises an amine terminated polyurethane dispersion. In some embodiments, the second layer comprises an amorphous polyester based polyurethane dispersion. In some embodiments, the second layer comprises a polyether based polyurethane dispersion. In some embodiments, the second layer comprises an aromatic or aliphatic polyurethane dispersion. In some embodiments, the second layer comprises an amine terminated polyurethane and a blocked isocyanate. In one embodiment, the second layer comprises NeoRez R605 and Imprafix 2794. In one embodiment, the second layer comprises Adwel 1665 and Aqualink 180. In one embodiment, the second layer comprises WD6011W and Aqualink DHT.

In some embodiments, the laminate has a thickness of less than 1.25 mil. In some embodiments, the laminate has a thickness of about 0.25-1.25 mil. In some embodiments, the laminate has a thickness of about 0.25-0.75 mil. In some embodiments, the laminate has a thickness of about 0.5-1.0 mil. In some embodiments, the laminate has a thickness of about 0.5-0.8 mil. In some embodiments, the first layer and/or the second layer has a thickness of about 0.1-0.3 mil. In some embodiments, the laminate exhibits a load of about 0.1-0.3 lb/f.

BRIEF DESCRIPTION OF THE FIGURES

Characteristics of the present invention will be more fully understood by reference to the following detailed description in conjunction with the attached drawings, in which.

US 12,605,925 B2

3

Figure 8:
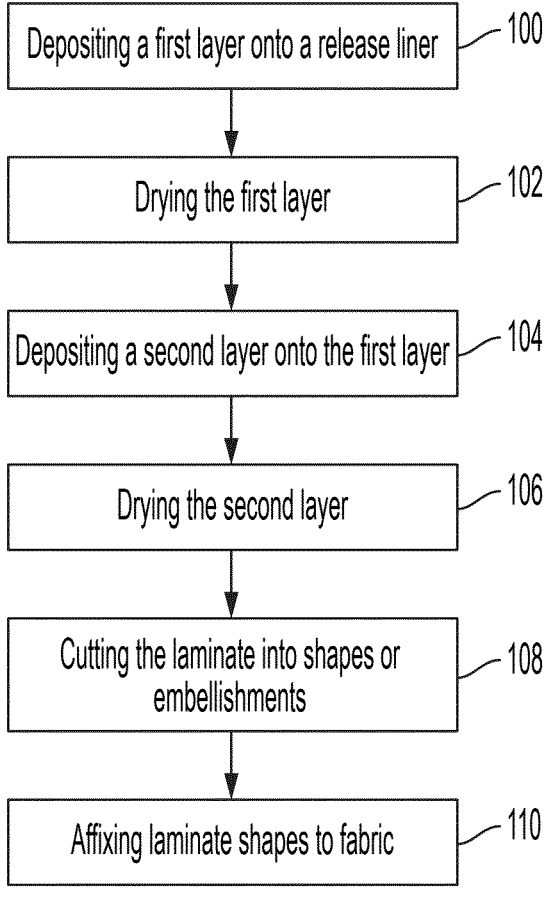

FIG. 8 is a flowchart for forming and using a laminate of the present invention.

Figure 9:
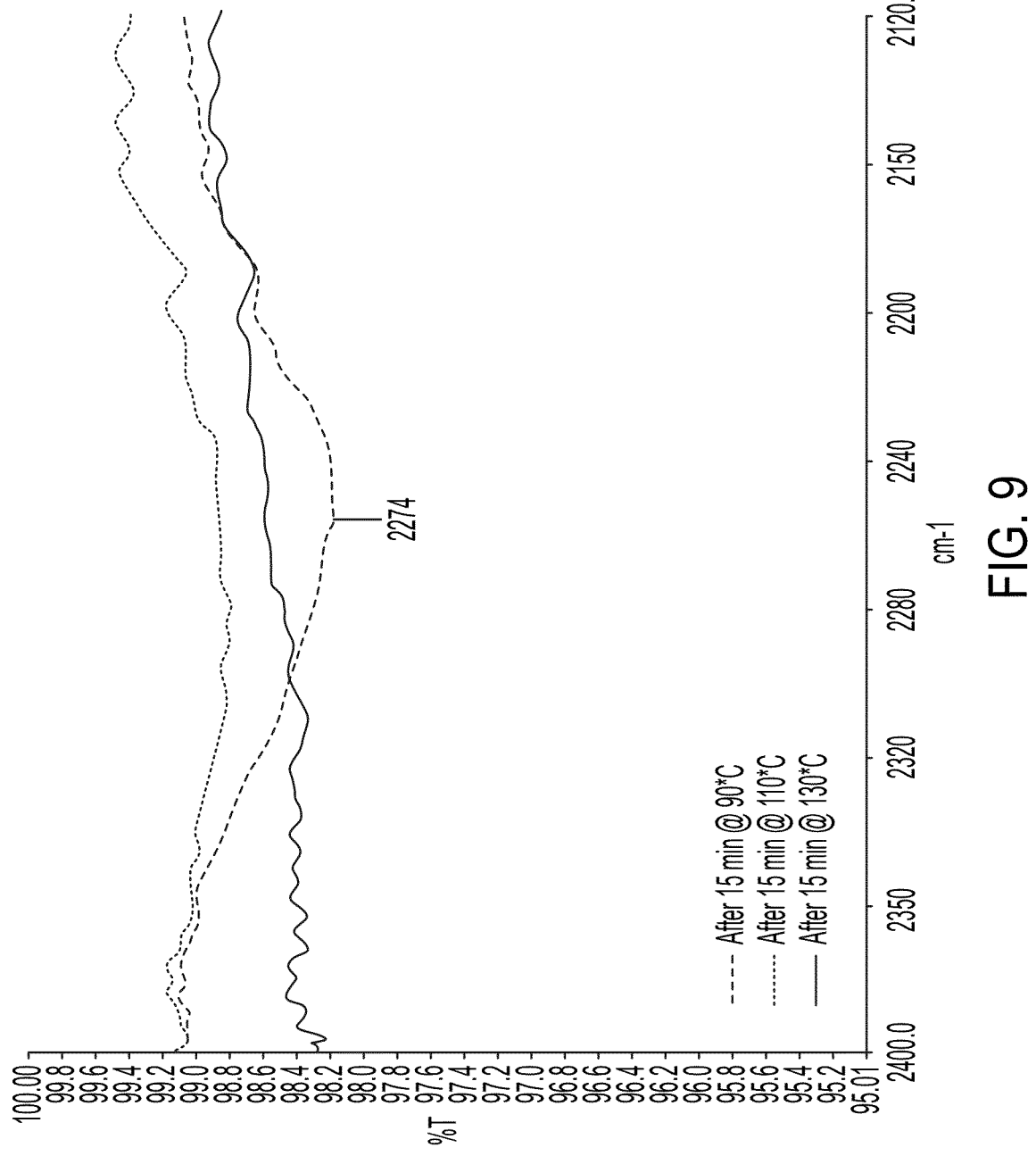

FIG. 9 is an infrared spectrum obtained using Fourier-transform infrared spectroscopy (FTIR). The spectrum shows isocyanate absorption of Adhesive 1 from Example 3. Adhesive 1 exhibits isocyanate retention at 2274 cm$^{-1}$ after exposure to elevated temperatures.

Figure 10:
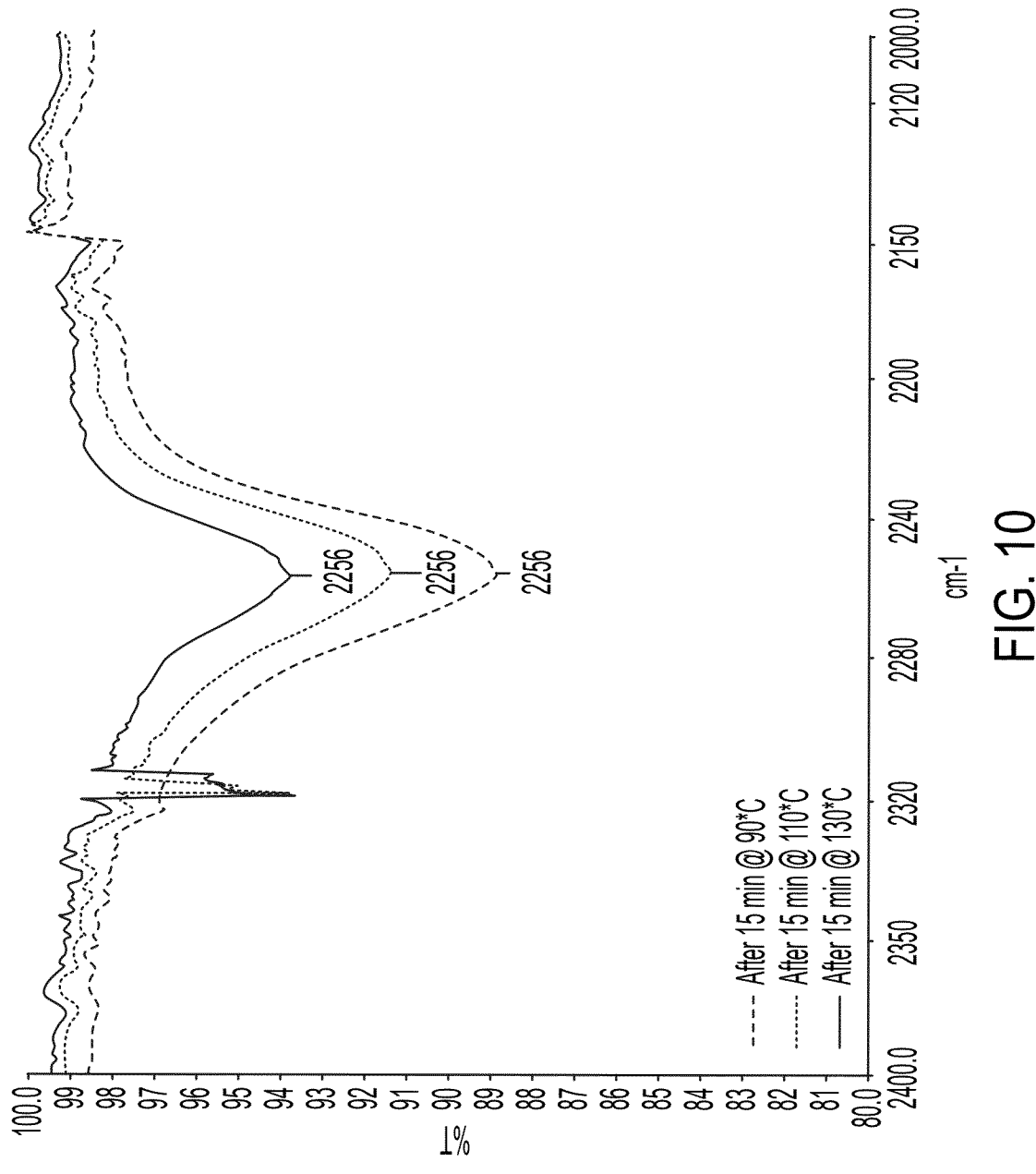

FIG. 10 is an infrared spectrum obtained using FTIR. The spectrum shows isocyanate absorption of Adhesive 2 from Example 3. Adhesive 2 exhibits isocyanate retention at 2256 cm$^{-1}$ after exposure to elevated temperatures.

Figure 11:
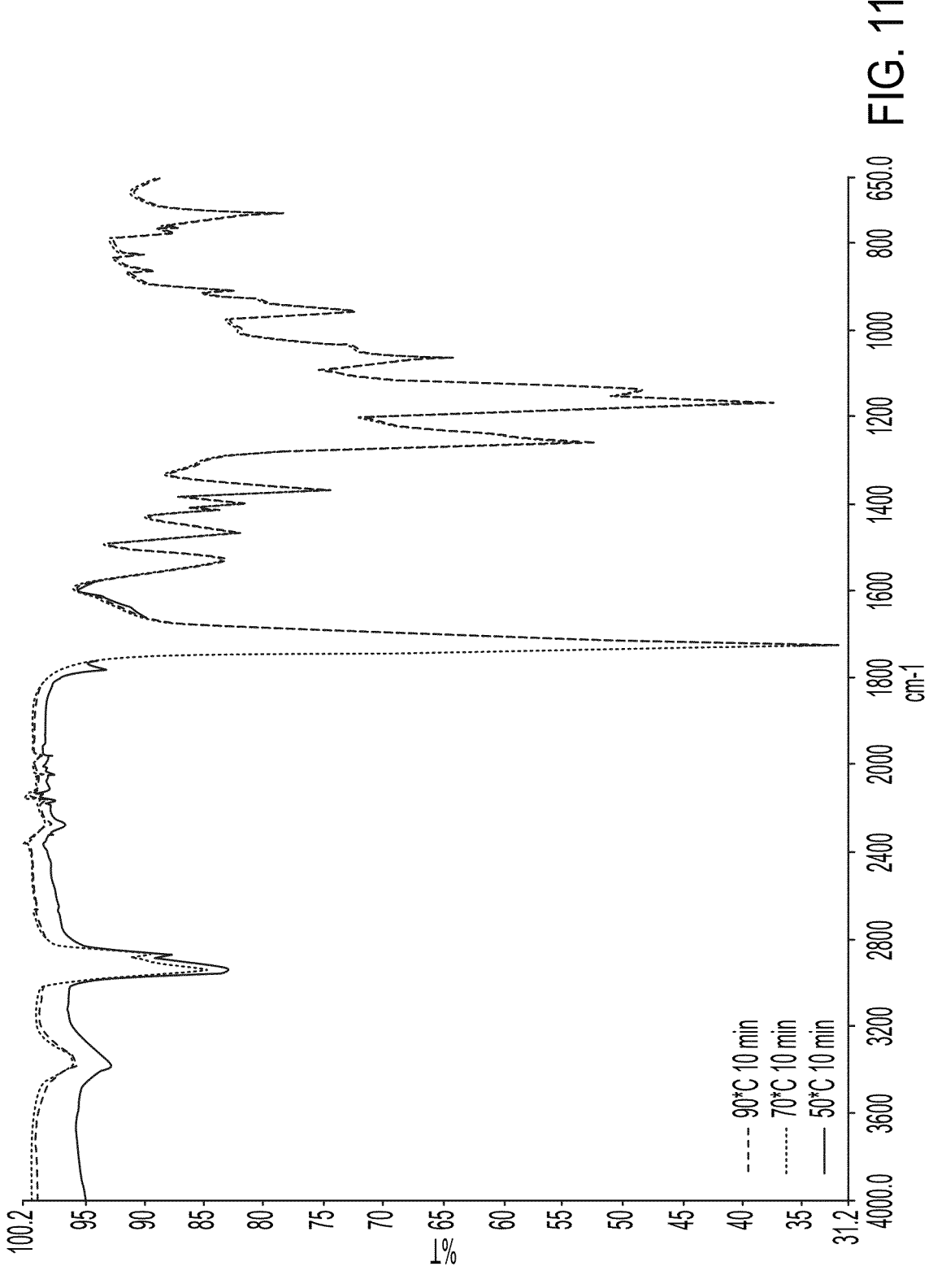

FIG. 11 is an infrared spectrum obtained using FTIR. The infrared spectrum shows Adhesive 1 (95% Adwel 1665+5% Aqualink 180) from Example 4 after 50° C., 70° C. and 90° C. drying.

Figure 12:
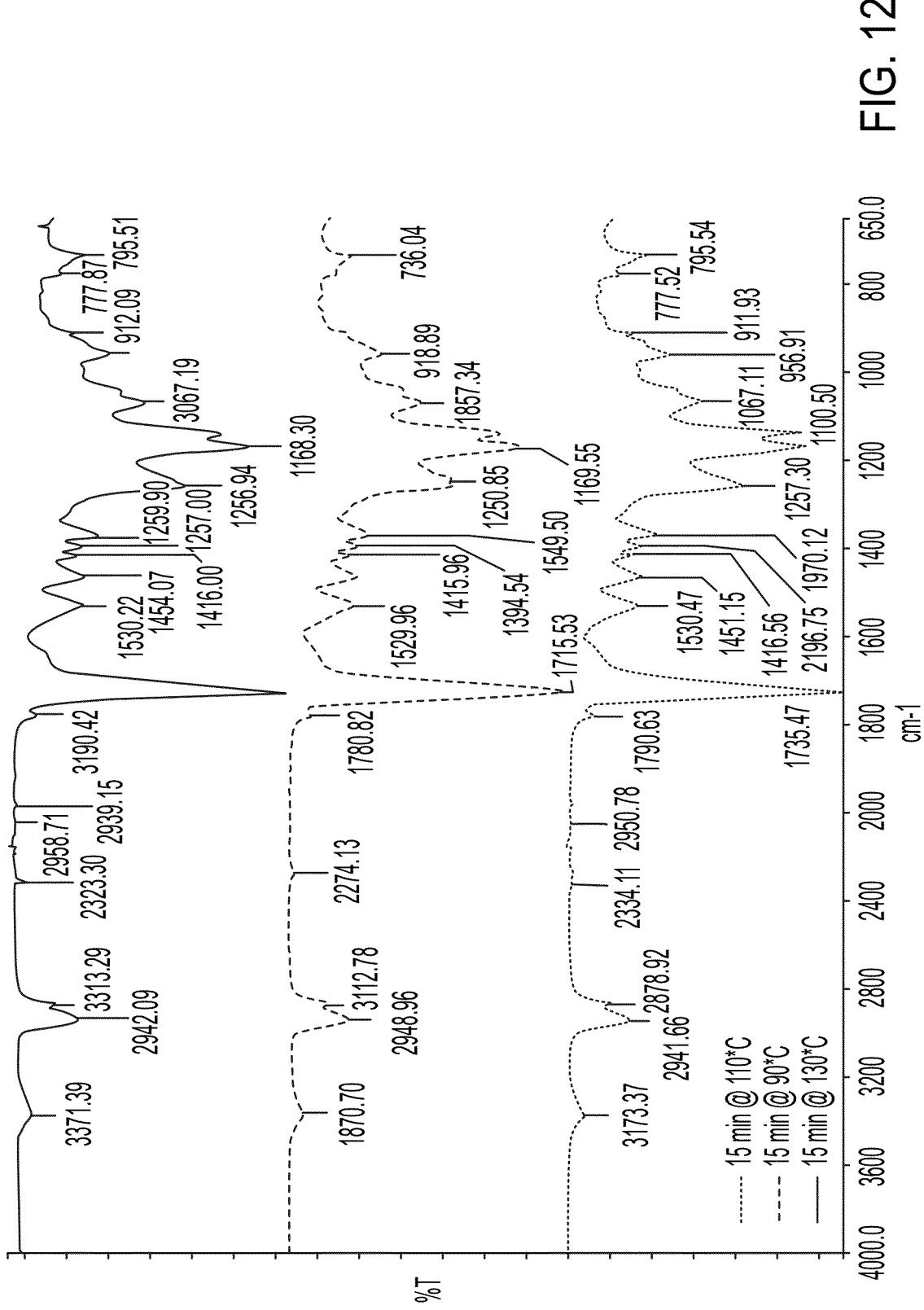

FIG. 12 is an infrared spectrum obtained using FTIR. The infrared spectrum shows Adhesive 1 (95% Adwel 1665+5% Aqualink 180) from Example 4 after 90° C., 110° C. and 130° C. drying.

Figure 13:
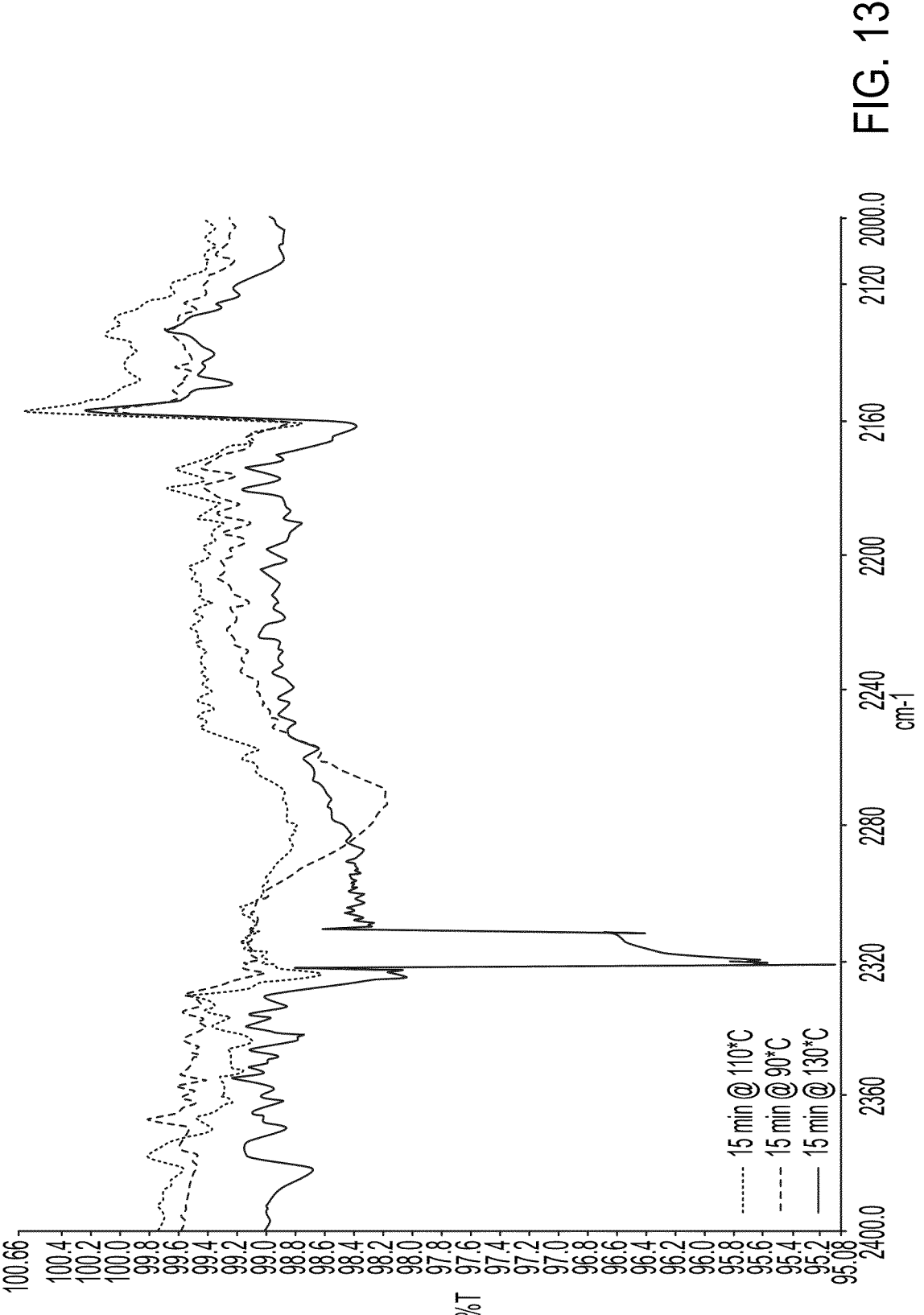

FIG. 13 is an infrared spectrum obtained using FTIR. The infrared spectrum shows Adhesive 1 (95% Adwel 1665+5% Aqualink 180) from Example 4 after 90° C., 110° C. and 130° C. drying. Spectrum from 2,100 to 2,400 cm-1.

Figure 14:
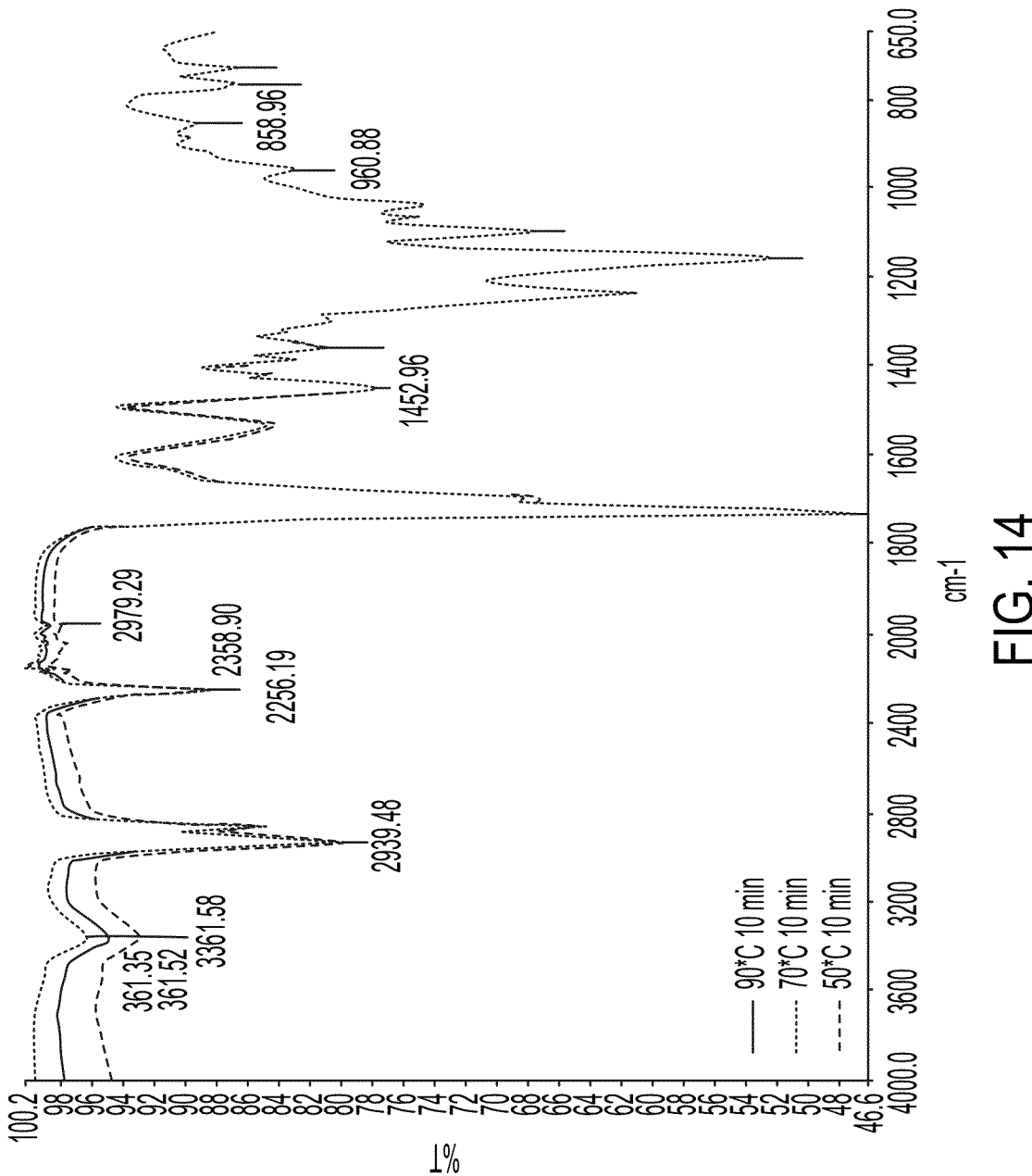

FIG. 14 is an infrared spectrum obtained using FTIR. The infrared spectrum shows Adhesive 2 (85% WD 6011+ Aqualink DHT) from Example 4 after 50° C., 70° C. and 90° C. drying.

Figure 15:
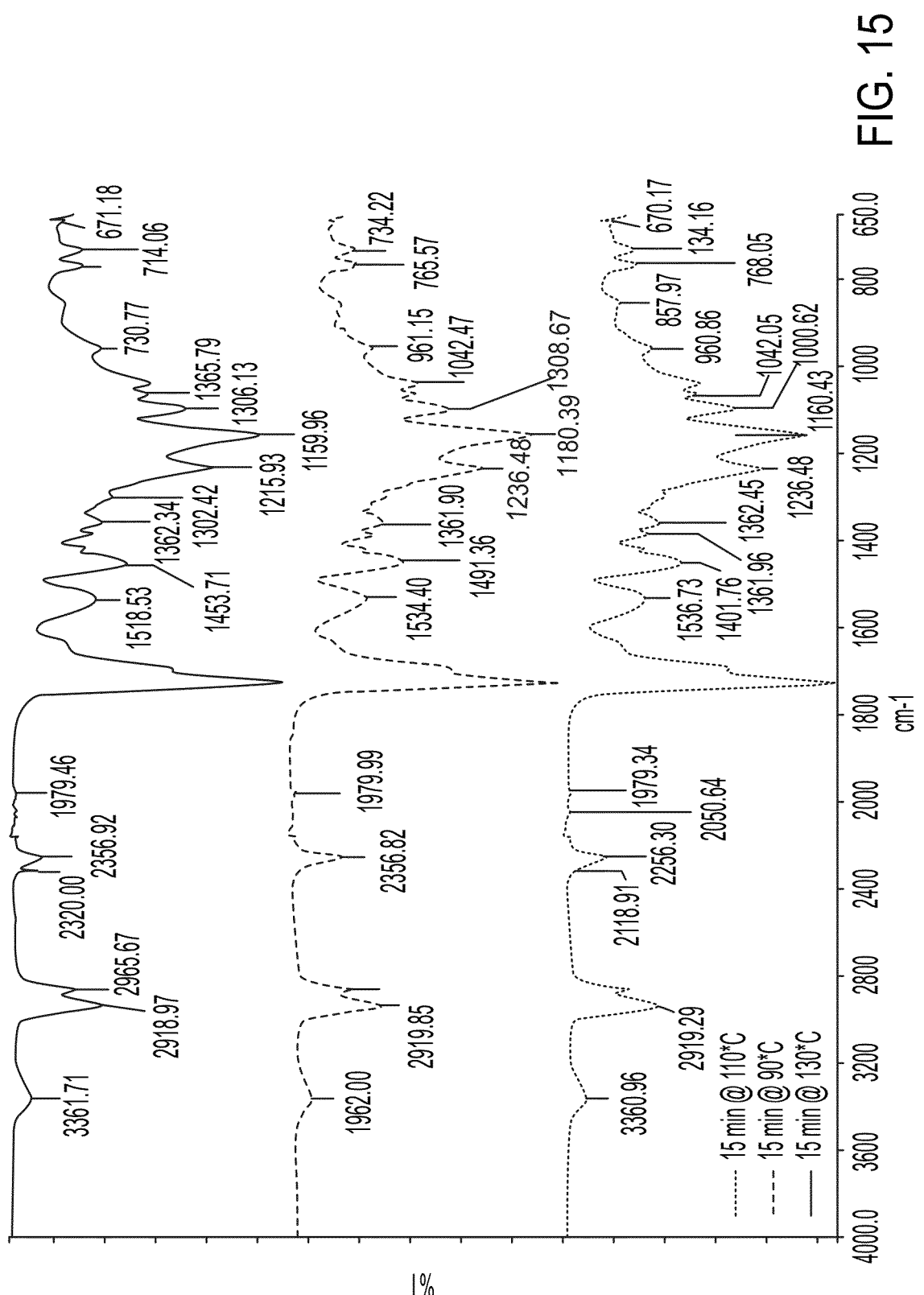

FIG. 15 is an infrared spectrum obtained using FTIR. The infrared spectrum shows Adhesive 2 (85% WD 6011+ Aqualink DHT) from Example 4 after 90° C., 110° C. and 130° C. drying.

Figure 16:
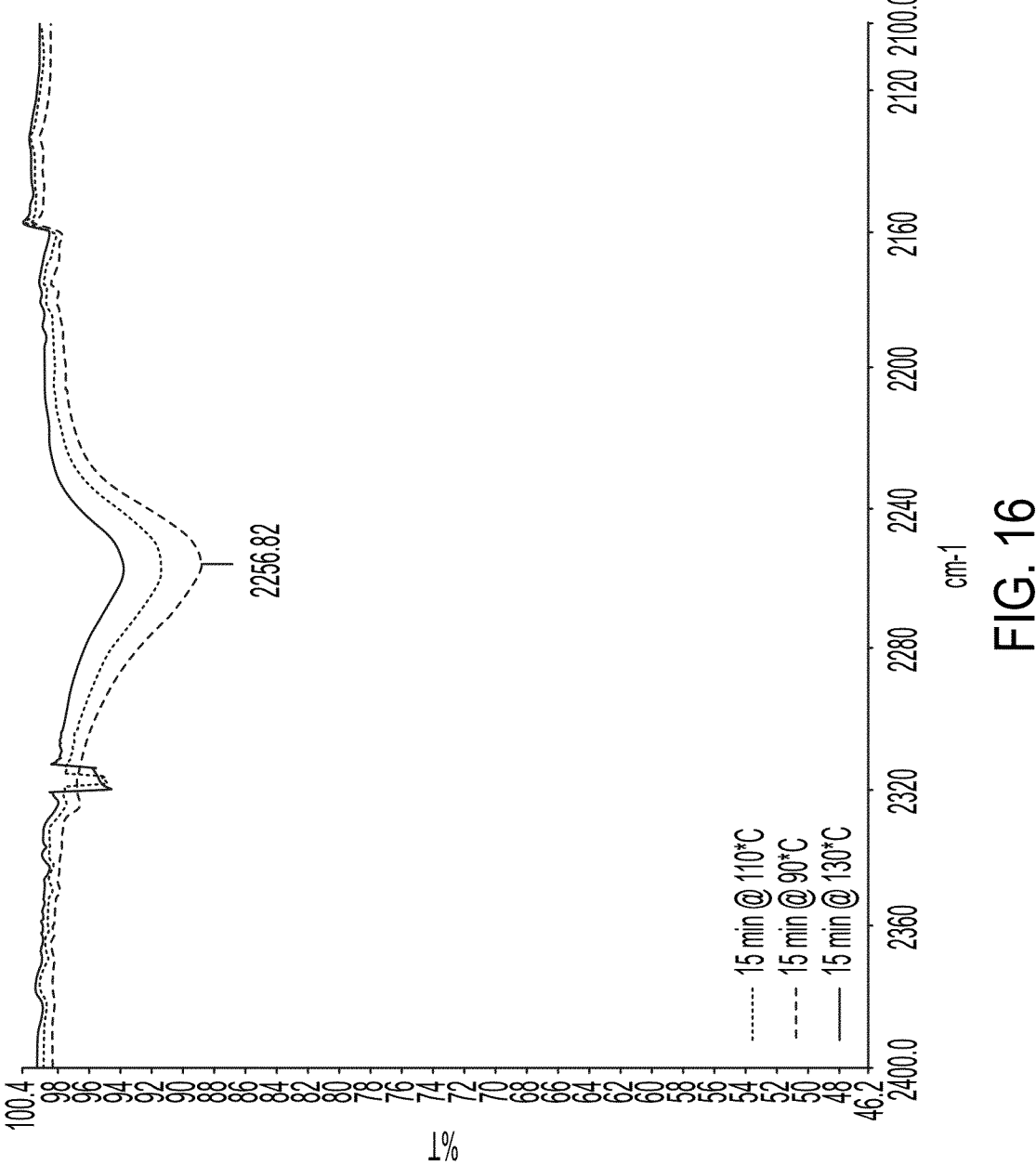

FIG. 16 is an infrared spectrum obtained using FTIR. The infrared spectrum shows Adhesive 2 (85% WD 6011+ Aqualink DHT) from Example 4 after 90° C., 110° C. and 130° C. drying. Spectrum from 2,100 to 2,400 cm-1.

DETAILED DESCRIPTION

Disclosed herein are laminates, e.g., elastomeric multi-layer laminates, for use as decals. The disclosed laminates are lightweight and exhibit increased strength and elasticity compared to traditional decals and lettering. In addition, the disclosed laminates exhibit increased durability and will not delaminate during repeated wash and dry cycles.

FIGS. 1 through 8, wherein like parts are designated by like reference numerals throughout, illustrate an example embodiment or embodiments of laminates and methods for forming, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Aspects of the invention are directed to laminates, e.g., laminates for forming decals. In some embodiments, the laminate disclosed herein comprises a first layer, a second layer, and an optional third layer. In some embodiments, the first layer is deposited onto a release liner and the second layer is deposited onto the first layer. The first layer of the laminate may be an outer layer and the second layer of the laminate may be an adhesive layer, e.g., a hot melt adhesive layer.

In some embodiments, the first layer is a color layer and/or barrier layer. For example, the first layer may include a pigment, e.g., to provide a color for the decal that will be obtained from the laminate. In some aspects, a pigment may be carbon black, a colored pigment, or white TiO2 (e.g., pigments from Clariant-Avient). In some embodiments, the first layer is produced using a polyurethane material, e.g., a polyether or polyester based polyurethane. In some embodiments, the first layer will comprise a polyurethane exhibiting a high melt temperature. A polyurethane exhibiting a high melt temperature contributes to the laminate's ability to exhibit wear resistance and washability. Non-limiting examples of the material used to form the first layer include: Impranil DAH, Impranil DL 1380, Impranil DL 2077, Impranil DL 1537, Impranil DLU, Impranil DL 1116, Impranil DL 1554, Impranil DL 1068, Impranil DL 1069, NeoRez R 967, NeoPac R-9020, NeoRez R-9340, NeoRez R-1010, Joncryl U4190, Luphen D259U, and Luphen 3685.

In some embodiments, the second layer is an adhesive layer. For example, the second layer may comprise a hot melt adhesive. In some embodiments, the second layer is produced using a polyester or polyether based polyurethane, optionally in combination with a cross-linker. In some embodiments, the adhesive polyurethane dispersion is capable of reacting with the cross-linker (e.g., isocyanate). The adhesive polyurethane dispersion may be capable of providing good flexibility. In some embodiments, the second layer comprises a non-crystalline polyester or polyether based polyurethane. In some embodiments, the second layer comprises an amine terminated polyurethane dispersion. In some embodiments, the second layer comprises an amorphous polyester based polyurethane dispersion. In some embodiments, the second layer comprises a polyether based polyurethane dispersion. In some embodiments, the second layer comprises an aromatic or aliphatic polyurethane dispersion. In some embodiments, the second layer comprises an amine terminated polyurethane dispersion. In some embodiments, the polyurethane dispersion contains terminal reactive OH and NH groups. In alternative embodiments, the polyurethane dispersion does not contain specific reactive OH and NH groups.

In some embodiments, the cross-linker comprises an isocyanate, e.g., a blocked isocyanate or encapsulated isocyanate. In some embodiments, the isocyanate is a chemically blocked multi-functional isocyanate based on isophorone diisocyanate (IPDI) trimer. In some embodiments, the isocyanate is an encapsulated isocyanate where the isocyanate is encapsulated in micron sized micro-capsules. The isocyanate may be a toluene diisocyanate (TDI) dimer. In one embodiment, the second layer comprises an amine terminated polyurethane and a blocked or encapsulated isocyanate. Non-limiting examples of the polyurethane dispersions include NeoRez R605, NeoRez R9621, NeoRez R-9630, Hauthane L-2255, Hauthane L-2357, Hauthane L-2961, Hauthane HD-2024, WD-6011W-105, WD-6056, and Adwel 1665. Non-limiting examples of the blocked isocyanate include Imprafix 2794, Vestanat B1358/100, Aqualink 180, and Aqualink DHT.

The selection of the polyurethane dispersion, and whether it does or does not contain reactive OH and NH groups, may determine the isocyanate that may be selected to be used in combination. For example, a polyurethane dispersion that contains reactive OH and NH groups may be combined with a crosslinker, such as an IPDI-trimer crosslinker, that is less reactive than other crosslinkers and requires the reactive groups on the polyurethane dispersion. Alternatively, a polyurethane dispersion that does not contain reactive OH and NH groups may be combined with a crosslinker, such as a TDI-dimer, that is very reactive and will combine with the polyurethane dispersion to make a successful adhesive. Exemplary combinations of polyurethane dispersions and isocyanate crosslinkers include, but are not limited to, NeoRez R605 and Imprafix 2794, WD6011W and Aqualink DHT, or Adwel 1665 and Aqualink 180.

In some embodiments, the second layer comprises a pigment. A pigment may be chosen so that the first/top/outer layer stands out against the second layer. In some embodiments, the second layer comprises a color, white or black pigment.

In some embodiments, one or more additives may be added to the first and/or second layer. Non-limiting examples of these additives include thickeners (e.g., acrylic or polyurethane thickeners), biocides or defoamers, cosolvents, pH adjustment additives, and wetting aides.

In some embodiments, the release liner is chosen so as to provide a matt texture to the first layer (the outer layer), i.e., in some aspects, the release liner is textured. The matt texture of the release liner enhances the soft feel/touch of the embellishment and further helps prevent blocking of the embellishment to itself during wash. In some embodiments, the release liner is produced from one or more polyurethane dispersions, e.g., water-based polyurethane dispersions. In some embodiments, the release liner comprises a material selected from the group consisting of silicone coated paper, polyethylene terephthalate (e.g., Coveme PET liner), polypropylene, and the like.

In some embodiments, the laminate comprises a third layer. A third layer may be deposited between the first layer and the second layer to provide a white background for the color or pigment of the first layer (outer layer) to stand out or pop. In some embodiments, the optional third layer comprises a polyurethane material, e.g., a polyether or polyester based polyurethane. Non-limiting examples of the material used to form the first layer include: Impranil DAH, Impranil DL 1380, Impranil DL 2077, Impranil DL 1537, Impranil DLU, Impranil DL 1116, Impranil DL 1554, Impranil DL 1068, Impranil DL 1069, NeoRez R 967, NeoPac R-9020, NeoRez R-9340, NeoRez R-1010, Joncryl U4190, Luphen D259U, and Luphen 3685. In one embodiment, a cross-linker is added to the third layer.

In alternative embodiments, a laminate comprises a first layer as described above, i.e., a color and/or barrier layer, and further comprises a second layer comprising a thermoplastic polyurethane (TPU). A TPU second layer may act as an adhesive and/or film layer. In some aspects, the first layer is deposited on a liner prior to deposition of the TPU second layer. In some embodiments, the TPU second layer is deposited on the first layer by heat lamination. Alternatively, the TPU second layer is deposited on the first layer by extrusion. Benefits of this alternative laminate include, but are not limited to, lower cost (e.g., due to lack of crosslinkers), TPU adhesives penetrate certain fabrics (e.g., open fabrics) more easily, and the laminate may facilitate the mechanical recycling of a final garment at the end of its life.

In some embodiments, one or more layers of the laminate has a thickness of about 0.1 to 1.0 mil. 0.1 to 0.9 mil, 0.1 to 0.8 mil, 0.1 to 0.7 mil, 0.1 to 0.6 mil, 0.1 to 0.5 mil, 0.1 to 0.4 mil, 0.1 to 0.3 mil, 0.1 to 0.2 mil, 0.2 to 1.0 mil, 0.2 to 0.9 mil, 0.2 to 0.8 mil, 0.2 to 0.7 mil, 0.2 to 0.6 mil, 0.2 to 0.5 mil, 0.2 to 0.4 mil, 0.2 to 0.3 mil, 0.3 to 1.0 mil. 0.3 to 0.9 mil, 0.3 to 0.8 mil, 0.3 to 0.7 mil, 0.3 to 0.6 mil, 0.3 to 0.5 mil, 0.3 to 0.4 mil, 0.4 to 1.0 mil, 0.4 to 0.9 mil, 0.4 to 0.8 mil, 0.4 to 0.7 mil, 0.4 to 0.6 mil, 0.4 to 0.5 mil, 0.5 to 1.0 mil, 0.5 to 0.9 mil, 0.5 to 0.8 mil, 0.5 to 0.7 mil, 0.5 to 0.6 mil, 0.6 to 1.0 mil, 0.6 to 0.9 mil, 0.6 to 0.8 mil, 0.6 to 0.7 mil, 0.7 to 1.0 mil, 0.7 to 0.9 mil, 0.7 to 0.8 mil, 0.8 to 1.0 mil, 0.8 to 0.9 mil, or 0.9 to 1.0 mil. In some embodiments, one or more layers of the laminate has a thickness of about 0.1, 0.2, 0.3, 0.4, 0.5, 0.6, 0.7, 0.8, 0.9, or 1.0 mil. In one embodiment, each layer of the laminate has a thickness of about 0.1 to 1.0 mil, 0.1 to 0.9 mil, 0.1 to 0.8 mil, 0.1 to 0.7 mil, 0.1 to 0.6 mil, 0.1 to 0.5 mil, 0.1 to 0.4 mil, 0.1 to 0.3 mil, 0.1 to 0.2 mil, 0.2 to 1.0 mil, 0.2 to 0.9 mil, 0.2 to 0.8 mil, 0.2 to 0.7 mil, 0.2 to 0.6 mil, 0.2 to 0.5 mil, 0.2 to 0.4 mil, 0.2 to 0.3 mil, 0.3 to 1.0 mil, 0.3 to 0.9 mil, 0.3 to 0.8 mil, 0.3 to 0.7 mil, 0.3 to 0.6 mil, 0.3 to 0.5 mil, 0.3 to 0.4 mil, 0.4 to 1.0 mil, 0.4 to 0.9 mil, 0.4 to 0.8 mil, 0.4 to 0.7 mil, 0.4 to 0.6 mil, 0.4 to 0.5 mil, 0.5 to 1.0 mil, 0.5 to 0.9 mil, 0.5 to 0.8 mil, 0.5 to 0.7 mil, 0.5 to 0.6 mil, 0.6 to 1.0 mil, 0.6 to 0.9 mil, 0.6 to 0.8 mil, 0.6 to 0.7 mil, 0.7 to 1.0 mil, 0.7 to 0.9 mil, 0.7 to 0.8 mil, 0.8 to 1.0 mil, 0.8 to 0.9 mil, or 0.9 to 1.0 mil. In one embodiment, each layer of the laminate has a thickness of about 0.1, 0.2, 0.3, 0.4, 0.5, 0.6, 0.7, 0.8, 0.9, or 1.0 mil. In some embodiments, a first layer has a thickness that is greater than the thickness of the second layer. In one embodiment, a first layer and a second layer each have a thickness of about 0.1, 0.2, 0.3, 0.4, 0.5, 0.6, 0.7, 0.8, 0.9, or 1.0 mil. In one embodiment, a first layer and a second layer each have a thickness of about 0.5 mil. In one embodiment, a first layer has a thickness of about 0.7, 0.8, 0.9, 1.0, 1.1, 1.2 or 1.3 mil and a second layer has a thickness of about 0.2, 0.3, 0.4, 0.5, 0.6, 0.7, or 0.8 mil. In one embodiment, a first layer has a thickness of about 1.0 mil and a second layer has a thickness of about 0.5 mil. In some embodiments, the laminate has a thickness of less than 1.25 mil. In some embodiments, the laminate has a thickness of 0.25 to 1.25, 0.5 to 1.0 mil, or 0.5 to 0.8 mil. In some embodiments, the laminate has a thickness of about 0.2 to 1.3 mil, 0.2 to 1.2 mil. 0.2 to 1.1 mil. 0.2 to 1.0 mil, 0.2 to 0.9 mil, 0.2 to 0.8 mil, 0.2 to 0.7 mil, 0.2 to 0.6 mil. 0.2 to 0.5 mil, 0.2 to 0.4 mil, 0.3 to 1.3 mil, 0.3 to 1.2 mil, 0.3 to 1.1 mil. 0.3 to 1.0 mil, 0.3 to 0.9 mil, 0.3 to 0.8 mil, 0.3 to 0.7 mil, 0.3 to 0.6 mil, 0.3 to 0.5 mil. 0.4 to 1.3 mil, 0.4 to 1.2 mil, 0.4 to 1.1 mil, 0.4 to 1.0 mil, 0.4 to 0.9 mil, 0.4 to 0.8 mil, 0.4 to 0.7 mil, 0.4 to 0.6 mil, 0.5 to 1.3 mil, 0.5 to 1.2 mil, 0.5 to 1.1 mil, 0.5 to 1.0 mil, 0.5 to 0.9 mil, 0.5 to 0.8 mil, 0.5 to 0.7 mil, 0.6 to 1.3 mil, 0.6 to 1.2 mil, 0.6 to 1.1 mil. 0.6 to 1.0 mil, 0.6 to 0.9 mil, 0.6 to 0.8 mil, 0.7 to 1.3 mil, 0.7 to 1.2 mil, 0.7 to 1.1 mil, 0.7 to 1.0 mil, 0.7 to 0.9 mil, 0.8 to 1.3 mil, 0.8 to 1.2 mil, 0.8 to 1.1 mil, 0.8 to 1.0 mil, 0.9 to 1.3 mil, 0.9 to 1.2 mil, 0.9 to 1.1 mil, 1.0 to 1.3 mil, or 1.0 to 1.2 mil.

In some embodiments, one or more layers of the laminate has a thickness of about 3 to 8 microns, 3 to 7 microns, 3 to 7 microns, 3 to 6 microns, 3 to 5 microns, 3 to 4 microns, 4 to 8 microns, 4 to 7 microns, 4 to 6 microns, 4 to 5 microns, 5 to 8 microns, 5 to 7 microns, 5 to 6 microns, 6 to 8 microns, 6 to 7 microns, or 7 to 8 microns. In one embodiment, each layer of the laminate has a thickness of about 3 to 8 microns, 3 to 7 microns, 3 to 7 microns, 3 to 6 microns, 3 to 5 microns, 3 to 4 microns, 4 to 8 microns, 4 to 7 microns, 4 to 6 microns, 4 to 5 microns, 5 to 8 microns, 5 to 7 microns, 5 to 6 microns, 6 to 8 microns, 6 to 7 microns, or 7 to 8 microns. In some embodiments, the laminate has a thickness of less than 32 microns, or less than 30 microns. In some embodiments, the laminate has a thickness of about 6 to 32 microns, 6 to 19 microns, 12 to 25 microns, or 15 to 20 microns. In some embodiments, the laminate has a thickness of about 6 to 32 microns, 6 to 28 microns, 6 to 24 microns, 6 to 20 microns, 6 to 16 microns, 6 to 12 microns, 6 to 8 microns, 10 to 32 microns, 10 to 28 microns, 10 to 24 microns, 10 to 20 microns, 10 to 16 microns, 10 to 12 microns, 14 to 32 microns, 14 to 28 microns, 14 to 24 microns, 14 to 20 microns, 14 to 16 microns, 18 to 32 microns, 18 to 28 microns, 18 to 24 microns, 18 to 20 microns, 22 to 32 microns, 22 to 28 microns, 22 to 24 microns, 26 to 32 microns, 26 to 28 microns, or 30 to 32 microns. The thickness of the laminate may be such that when a decal or applique is applied to a garment it will have a low profile, e.g., will be invisible to the touch.

Figure 4:
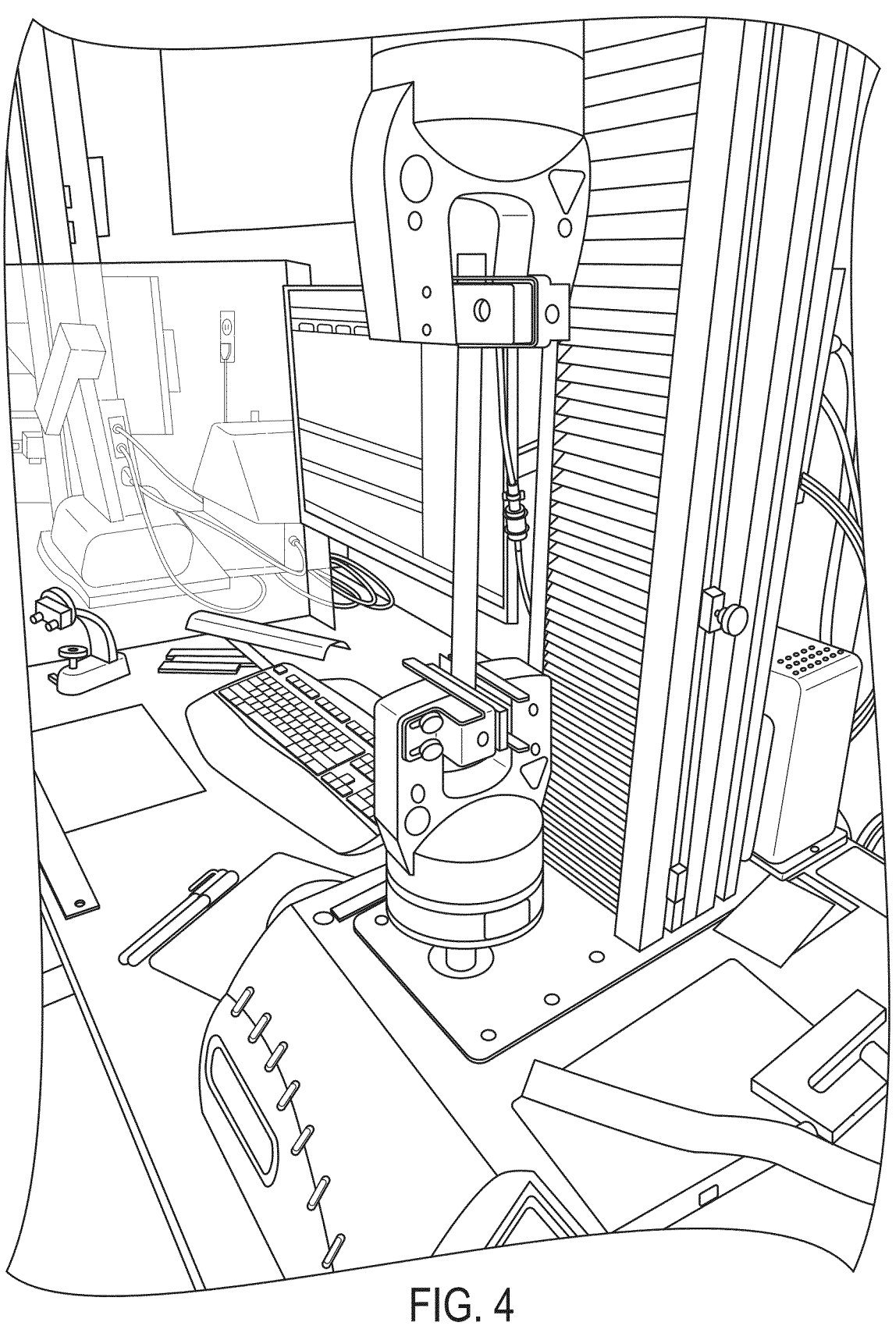
FIG. 4 is a photograph of an Instron machine used for characterizing the softness and elasticity of the laminate of the present invention.

The laminate disclosed herein exhibits softness and elasticity. Elasticity may be assessed using an extension test on an Instron machine, such as depicted in FIG. 4. In some embodiments, the laminate exhibits a load, e.g., under strain, of about 0.1 to 0.3 lb/f. e.g., for a laminate having a thickness of about 0.25 to 1.25 mil. In some embodiments, the laminate exhibits a load of about 0.5 to 1.3 Newtons, e.g., for a laminate having a thickness of about 6 to 32 microns. In some embodiments, the laminate has a gauge of about 8 to 42 gsm.

In some embodiments, the laminate is cut into one or more shapes, e.g., letters. The laminate may be cut using dye cutting and/or laser cutting. The laminate shapes may form decals, appliques, and/or embellishments to be affixed to a fabric. The individual shapes may be affixed to a garment, e.g., using heat laminate. In some embodiments, the garment is athletic wear. In some embodiments, the laminate is affixed or bonded to a fabric. Non-limiting examples of the type of fabric include cotton (e.g., cotton-Spandex), polyester (e.g., polyester-Spandex), and nylon (e.g., nylon-Spandex). In some embodiments, the laminate is bonded to a two or three-layer fabric, such as a fabric comprising a waterproof membrane. In some aspects, a laminate comprising a thicker second or adhesive layer is required for durability on a thicker fabric. For example, a thick fabric, such as a thermo-fleece fabric, may require a laminate comprising an adhesive layer that is greater than 0.5 mil. It is generally understood that some fabric, such as rip-stop nylon or a three-layer fabric, are more difficult to bond to and so a laminate will be selected based on the adhesion properties of the second layer.

Figure 1:
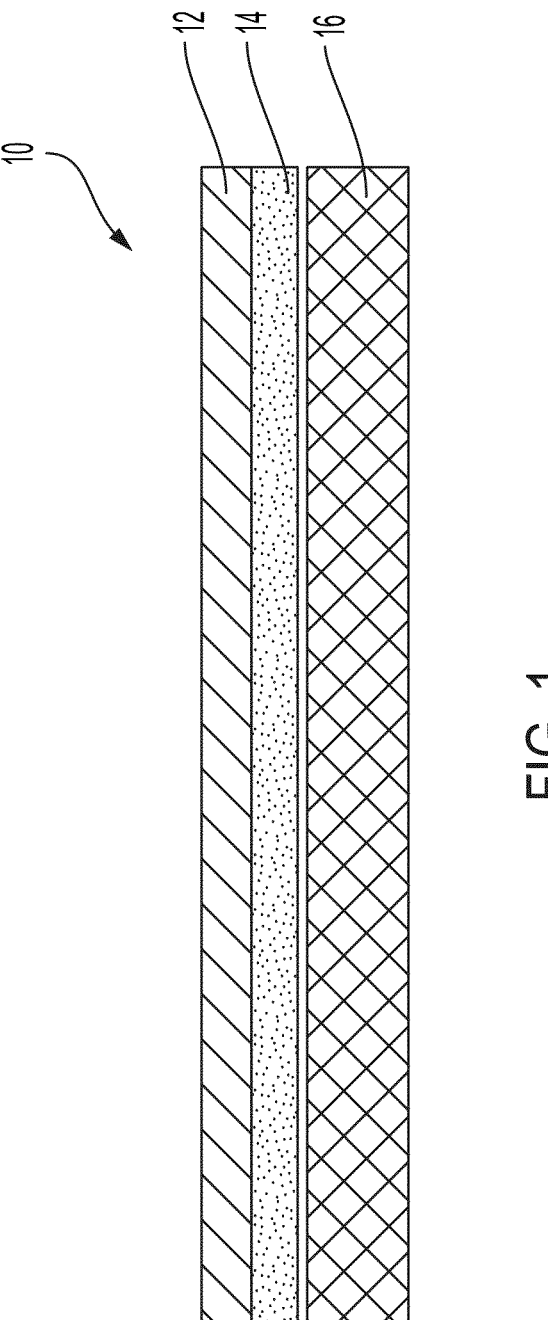
FIG. 1 is a diagrammatic illustration showing the design of a laminate of the present invention.
Figure 5:
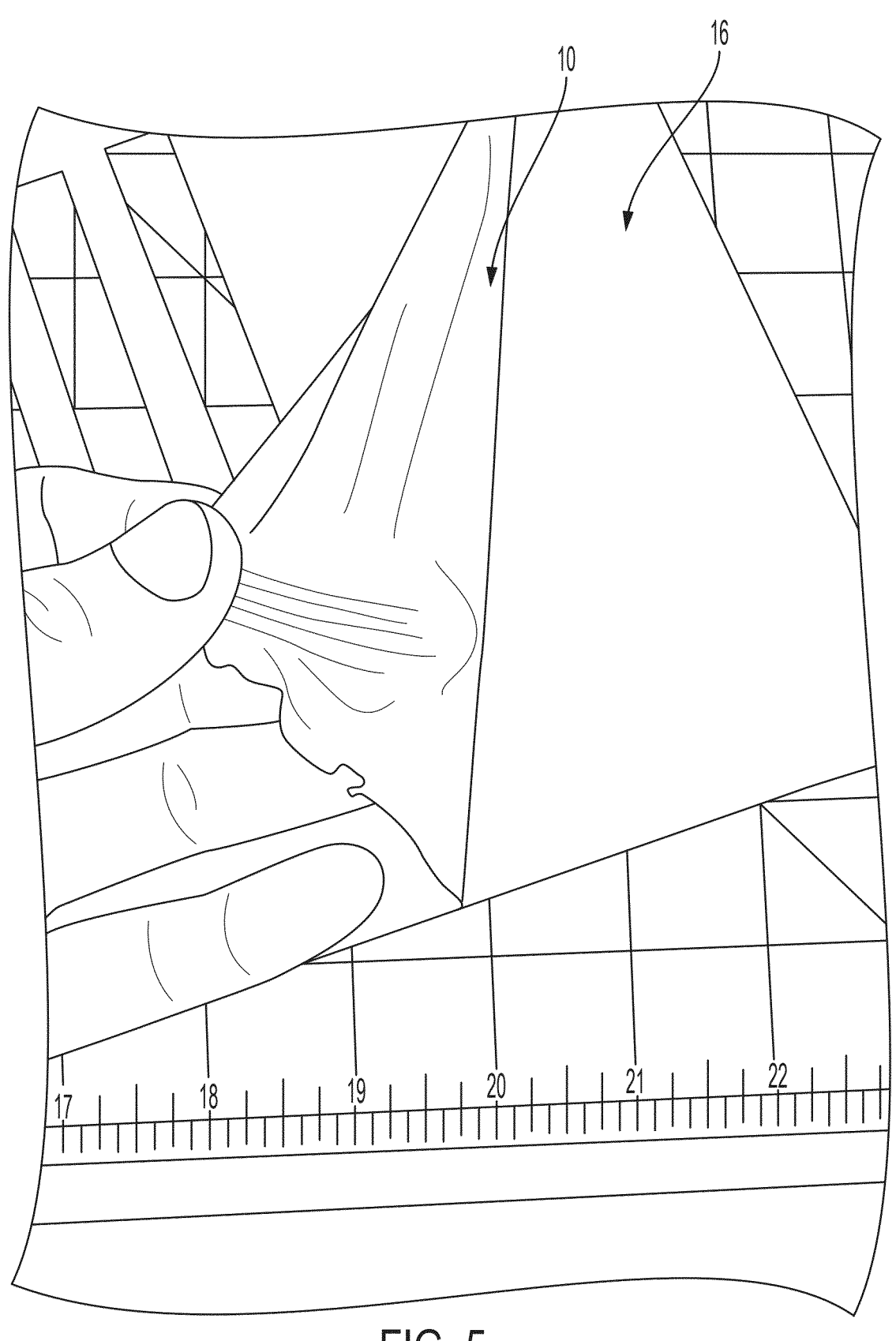
FIG. 5 is a photograph of a laminate of the present invention being removed from a release liner.
Figure 6A:
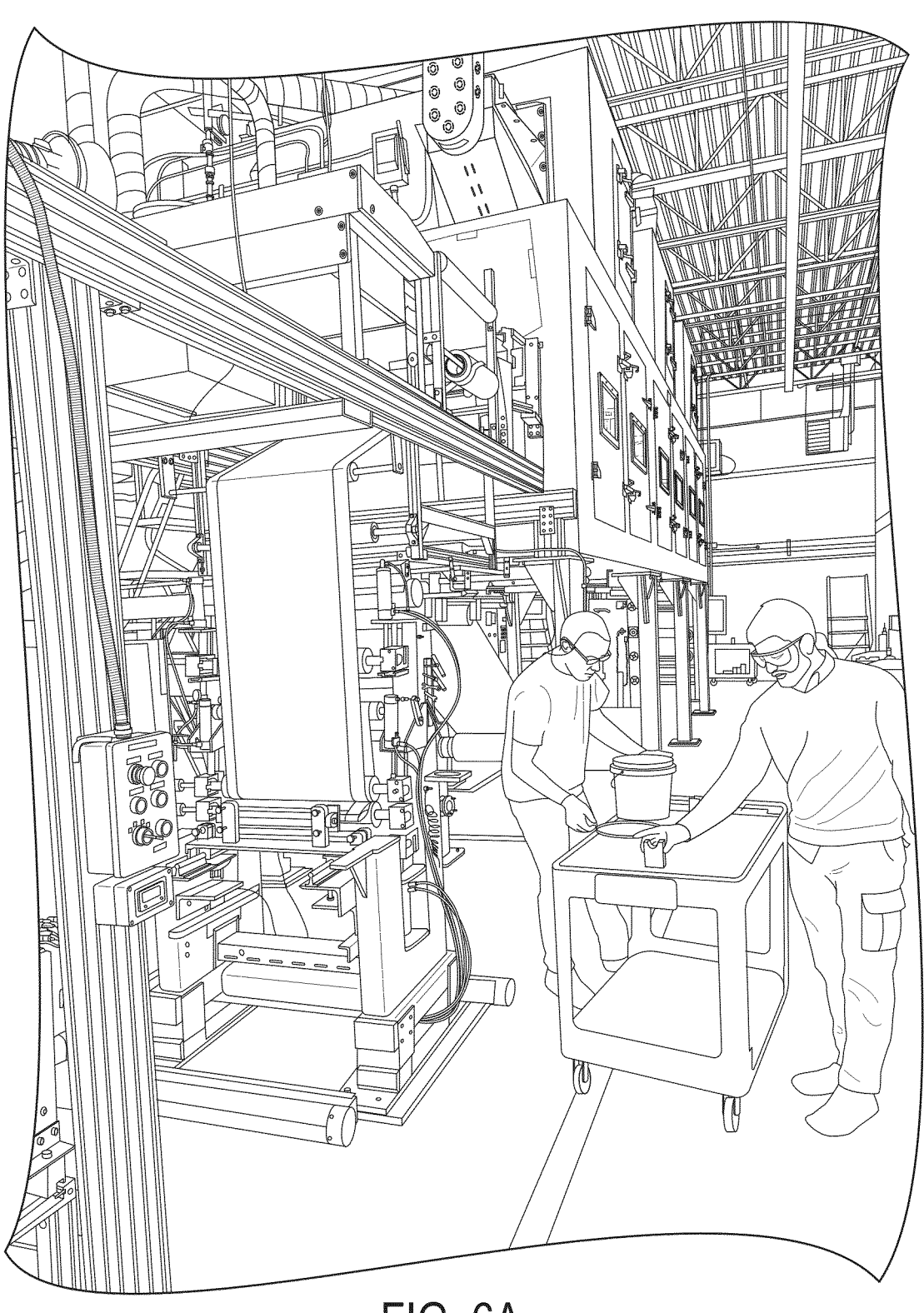
FIGS. 6A-6F are photographs demonstrating an exemplary process for preparing the laminate of the present invention on a gravure roller. Laminates comprising a white, black, and red barrier layer were prepared.
Figure 6B:
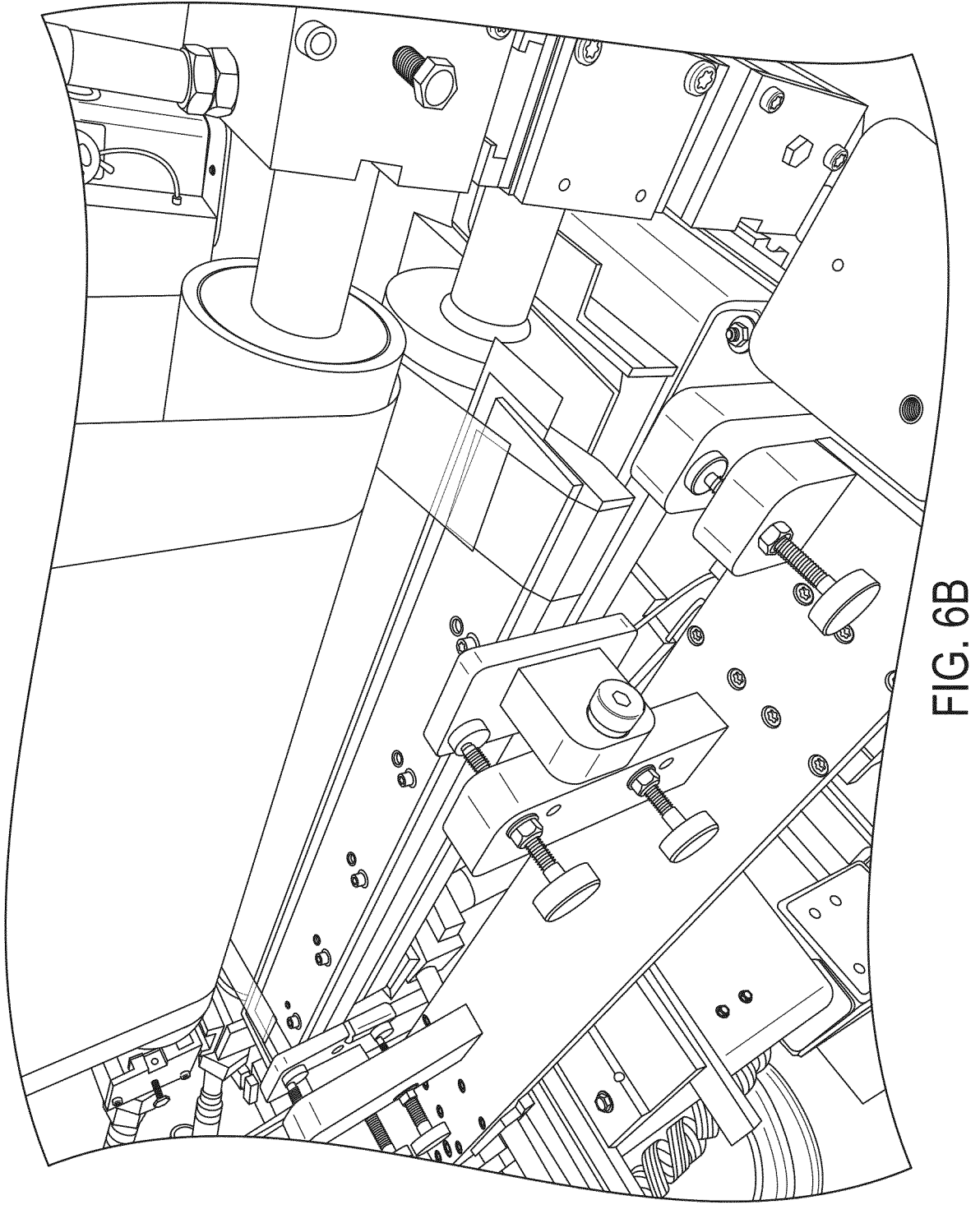
Figure 6C:
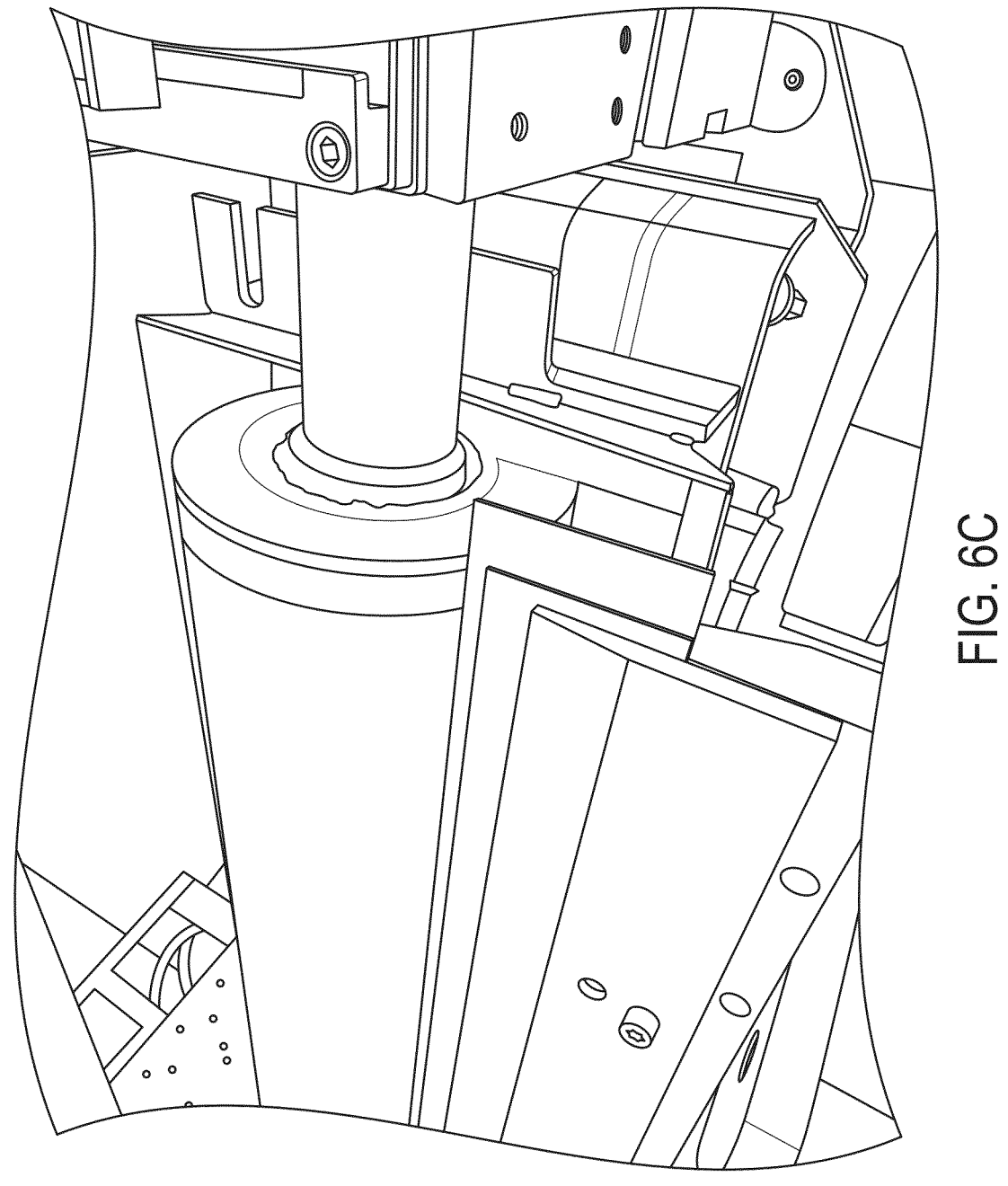
Figure 6D:
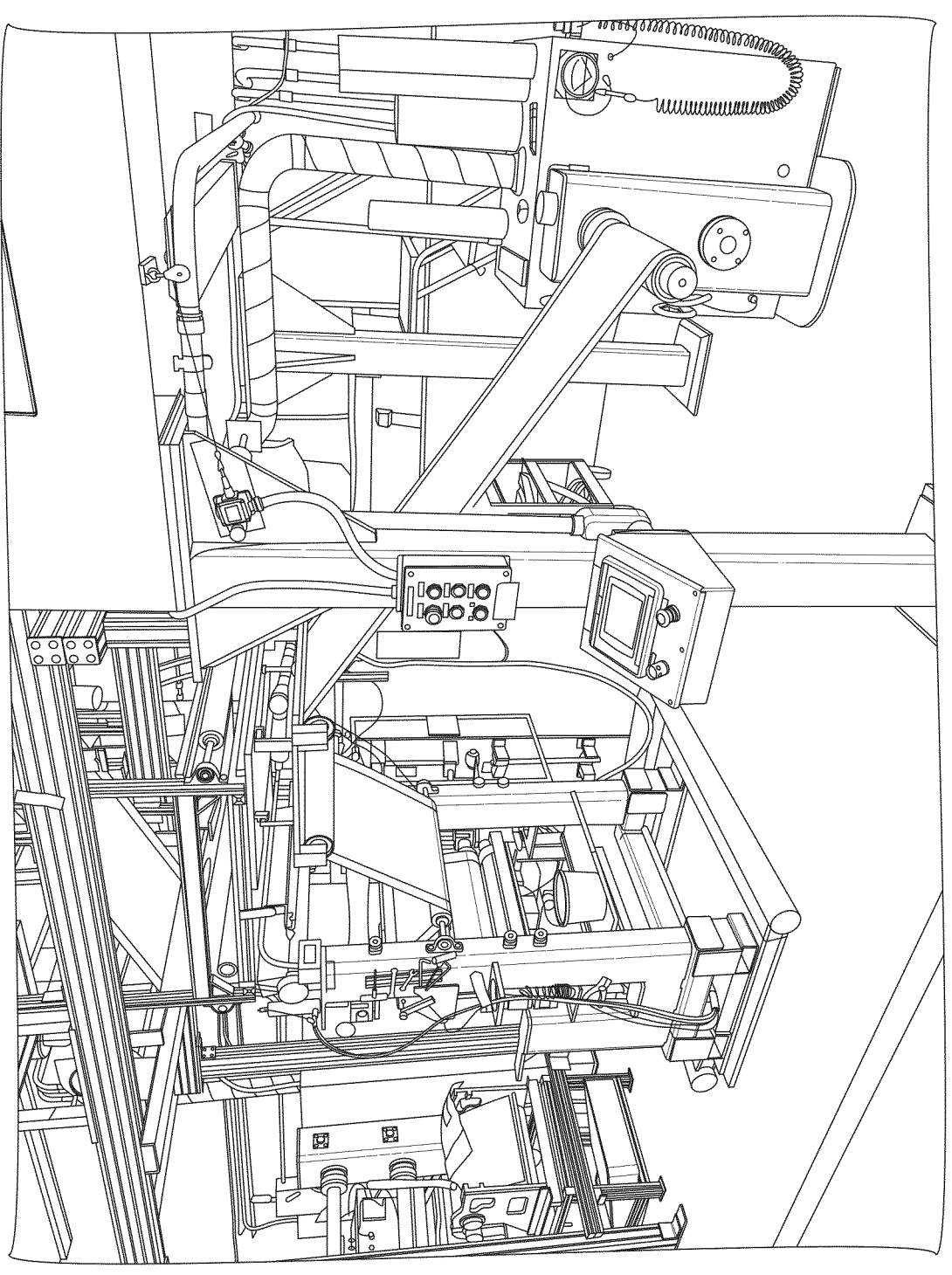
Figure 6E:
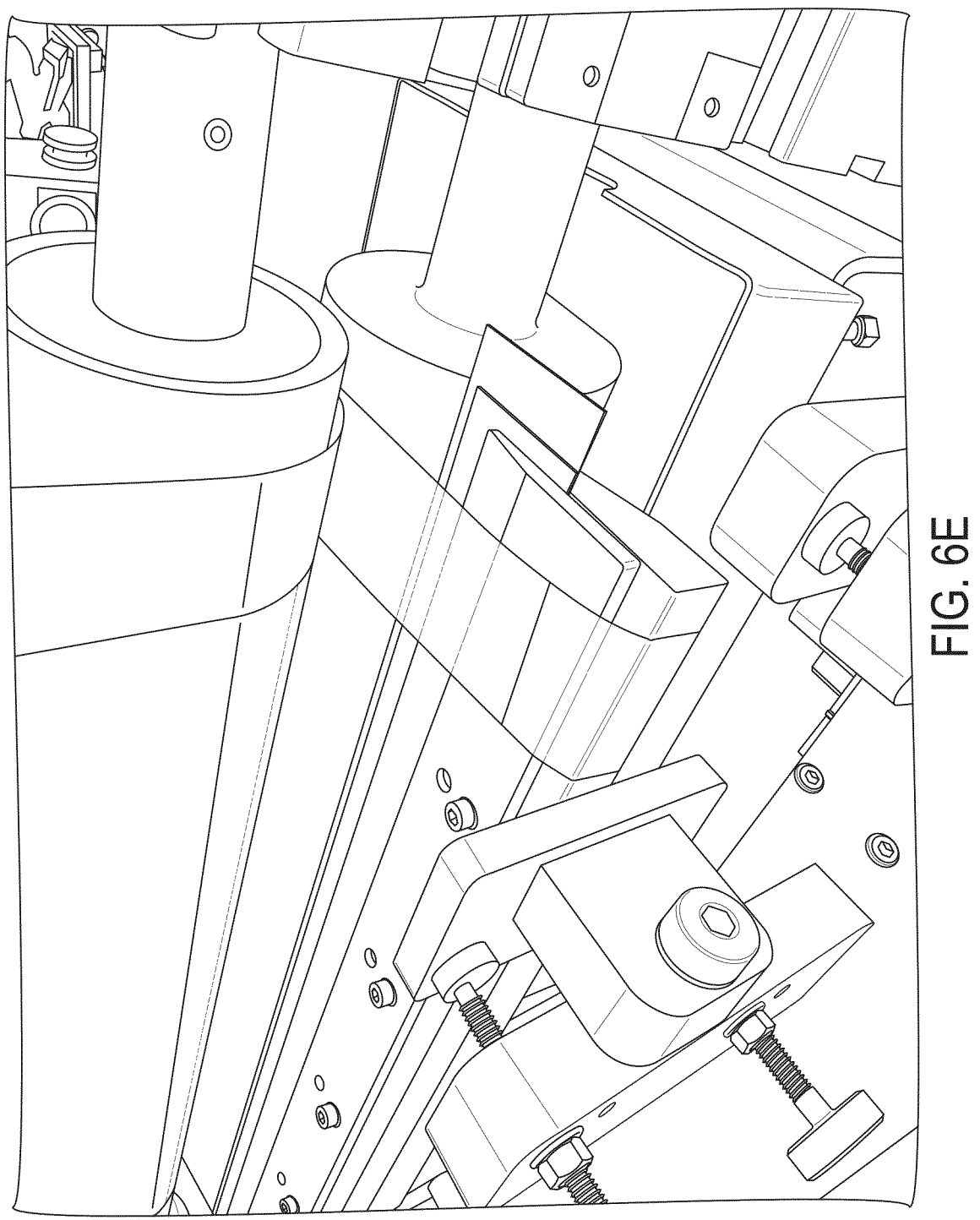
Figure 6F:
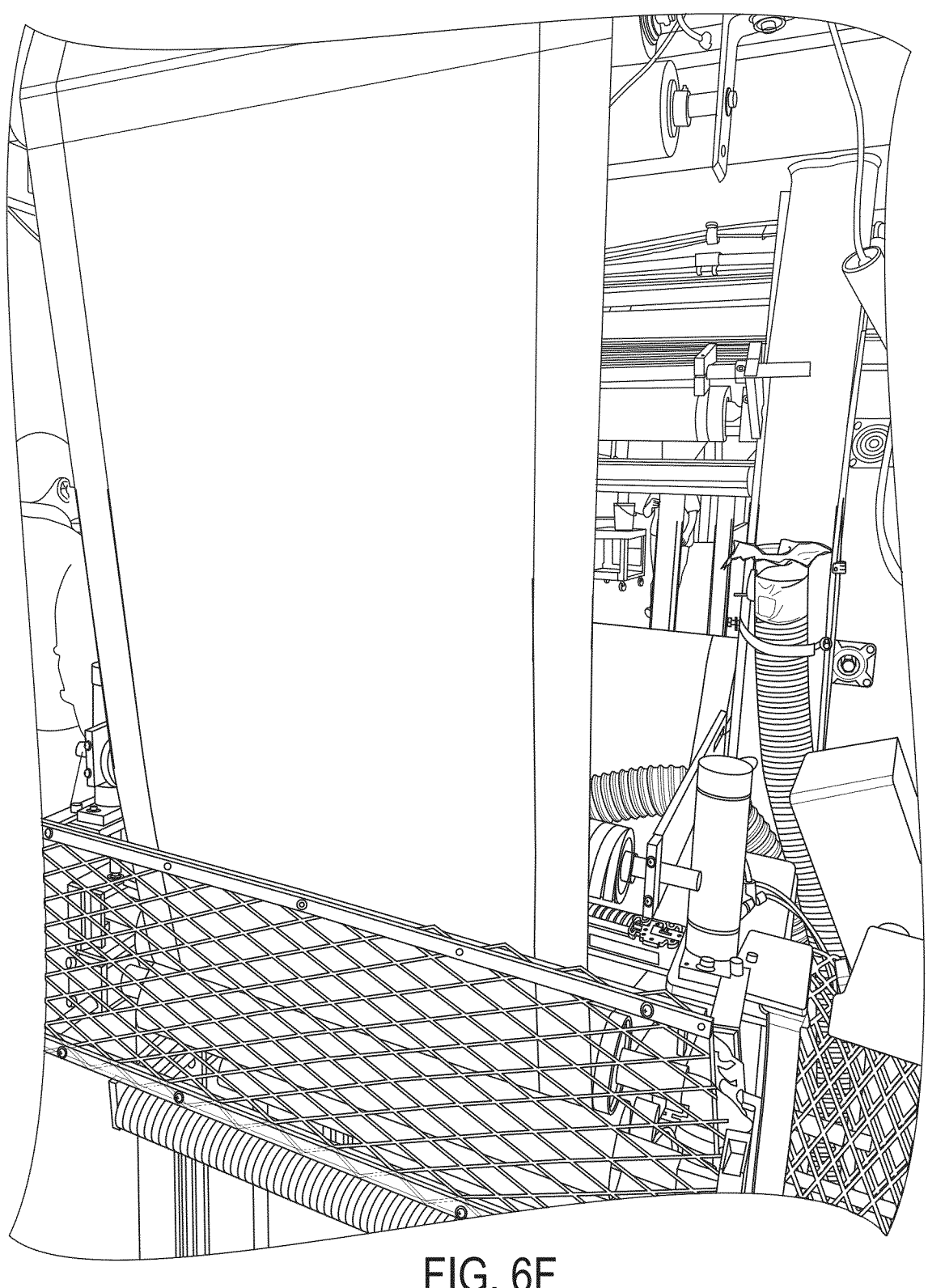

As shown in FIG. 1, a laminate may be a two-layer laminate 10. In some aspects, a two layer laminate comprises first layer (top layer) 12 and second layer (adhesive layer) 14. In some aspects, a two layer laminate is produced on release liner 16. As shown in FIG. 5, laminate 10 may be removed from the release liner 16. Laminate 10 may be cut into individual shapes 18 that may then be applied to a fabric 20. Release liner 16 may be removed from the laminate shape 18 after application to a fabric 20.

As outlined in FIG. 8, a method of forming and using a laminate 10 may comprise the steps of: depositing a first polyurethane dispersion layer on a release liner to form a first or barrier layer 100; drying the first layer 102; depositing a second polyurethane dispersion layer onto the first layer to form a second or adhesive layer 104; and drying the second layer 106. In some embodiments, the drying of the first and/or second layer occurs using hot air drying. In some embodiments, the first and/or second layers are dried at a temperature between 15° and 250° F., or between 17° and 230° F. In some embodiments, the first and/or second layers are dried at a temperature between 7° and 130° C., or between 75 and 110° C. In some embodiments, one or more layers of the laminate are dried in an oven, e.g., an oven that is about 100 feet long, at a line speed of about 15-20 fpm.

In some embodiments, the laminate is prepared using a knife over roll, Gravure roll, Mayer rod, or reverse roll coating. In one embodiment, a laminate is prepared using a Gravure roll, such as depicted in FIGS. 6A-6F, with a first or barrier layer being deposited on a release liner (see, for example, FIG. 6C) and then drying the barrier layer on the liner in an oven. The film is then wound up on a collection roller, moved back to a starting roller, and a second or adhesive layer is deposited on the barrier layer (see, for example, FIG. 6E) and dried out in an oven. In some embodiments, the laminate is prepared in a single pass, e.g., through multiple coating stations and ovens, or alternatively, is prepared in multiple passes, e.g., through a single coating station and oven. In alternative embodiments, the laminate is prepared by depositing an adhesive layer (e.g., a thermoplastic polyurethane) on a barrier layer and utilizing a belt laminator to laminate the adhesive layer to the barrier layer.

In some embodiments, the formed laminate is cut into shapes, such as letters or symbols, using dye cutting or laser cutting 108. The laminate shapes may then be affixed or bonded to a fabric 110. In one embodiment, the laminate shapes or embellishments are bonded to the fabric in a single bonding step, e.g., utilizing a heat press or oven. For example, a laminate shape or embellishment may be bonded to a fabric by utilizing a heat press at a temperature of about 135-165° C. 135-160° C. 135-155° C. 135-150° C. 135-145° C. 140-165° C. 140-160° C., 140-155° C., 140-150° C., 145-165° C., 145-160° C., 145-155° C., 150-165° C., or 150-160° C. for a period of time of about 20 seconds to 1 minute, 30 seconds to 1 minute, 40 seconds to 1 minute, 50 seconds to 1 minute, 20 to 50 seconds, 30 to 50 seconds, 40 to 50 seconds, 20 to 40 seconds, 30 to 40 seconds, or 20 to 30 seconds. In one embodiment, the laminate is bonded to the fabric using a heat press at a temperature of 150° C. for about 1 minute. In one embodiment, the laminate is bonded to the fabric using a heat press at a temperature of 165° C. for a period of about 20 seconds. The bonding process generally occurs in two parts, the first being the melting of the adhesive and its wetting and flowing on the substrate, and the second being the chemical crosslinking.

In one embodiment, the laminate shapes or embellishments are bonded to the fabric in a two-step bonding process, e.g., utilizing a heat press or oven. The laminate embellishment may first be tack bonded to the fabric at a temperature lower than the de-blocking temperature of the cross-linker (e.g., about 100-120° C.). The laminate may then be fully bonded to the fabric at a temperature greater than 135° C. In some embodiments, the laminate may be fully bonded to the fabric after one or more drying cycles at a temperature greater than 135° C. For example, the laminate may be fully bonded to a fabric by utilizing a heat press at a temperature of about 135-165° C. for a period of time of about 20 seconds to 1 minute.

The materials of the first and/or second layers, e.g., the polyurethane dispersions, may be pre-mixed and filtered, e.g., through a 50 micron filter, prior to depositing the first and/or second layers. In some embodiments, one or more layers of the laminate are deposited and/or dried using a hot air-dried coating process. In some embodiments, a laminate layer is coated using an air-dry coating process. In one embodiment, the layers of the laminate are deposited in a single pass with multiple application stations. In one embodiment, the layers of the laminate are deposited in multiple passes. In some embodiments, the drying temperature of the laminate is below the de-blocking temperature of blocked isocyanate. In some embodiments, a laminate comprises a third layer located between the adhesive layer and the barrier layer. In embodiments with a third layer, the drying temperature of the third layer may be about 140°-170° C., or about 150° C., such that the third or mid-layer is "pre-crosslinked" with the first or barrier layer. The pre-crosslinking may improve strength, durability, and chemical bonding of the mid layer to the barrier layer. In one embodiment, the laminate may be chemically cross-linked by heating the laminate past the de-blocking temperature of the blocked isocyanate, e.g., for about 15 seconds at 150° C., in a heat press.

Figure 7A:
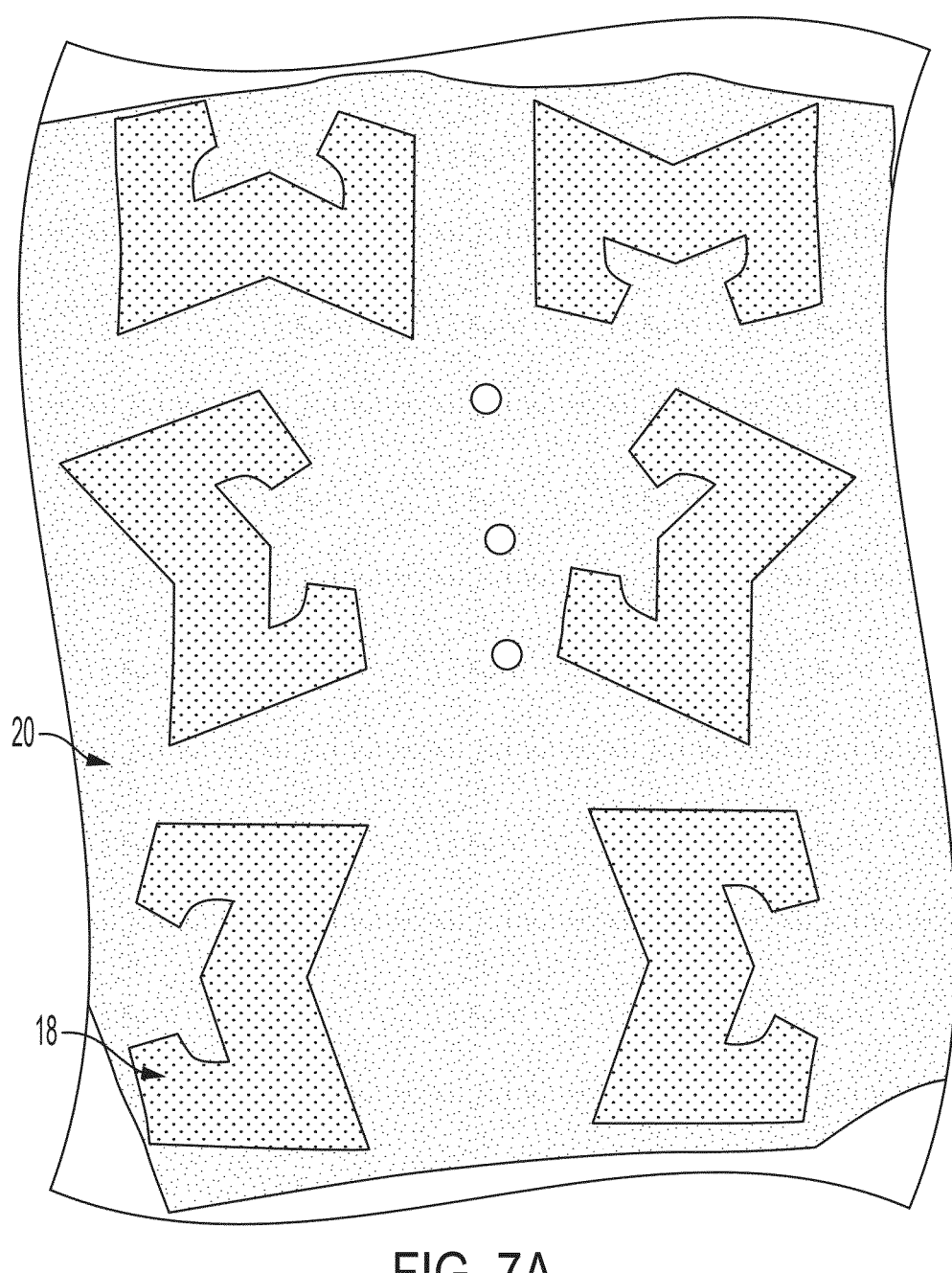
FIGS. 7A-7C are photographs showing examples of decals manufactured using the laminate of the present invention.
Figure 7B:
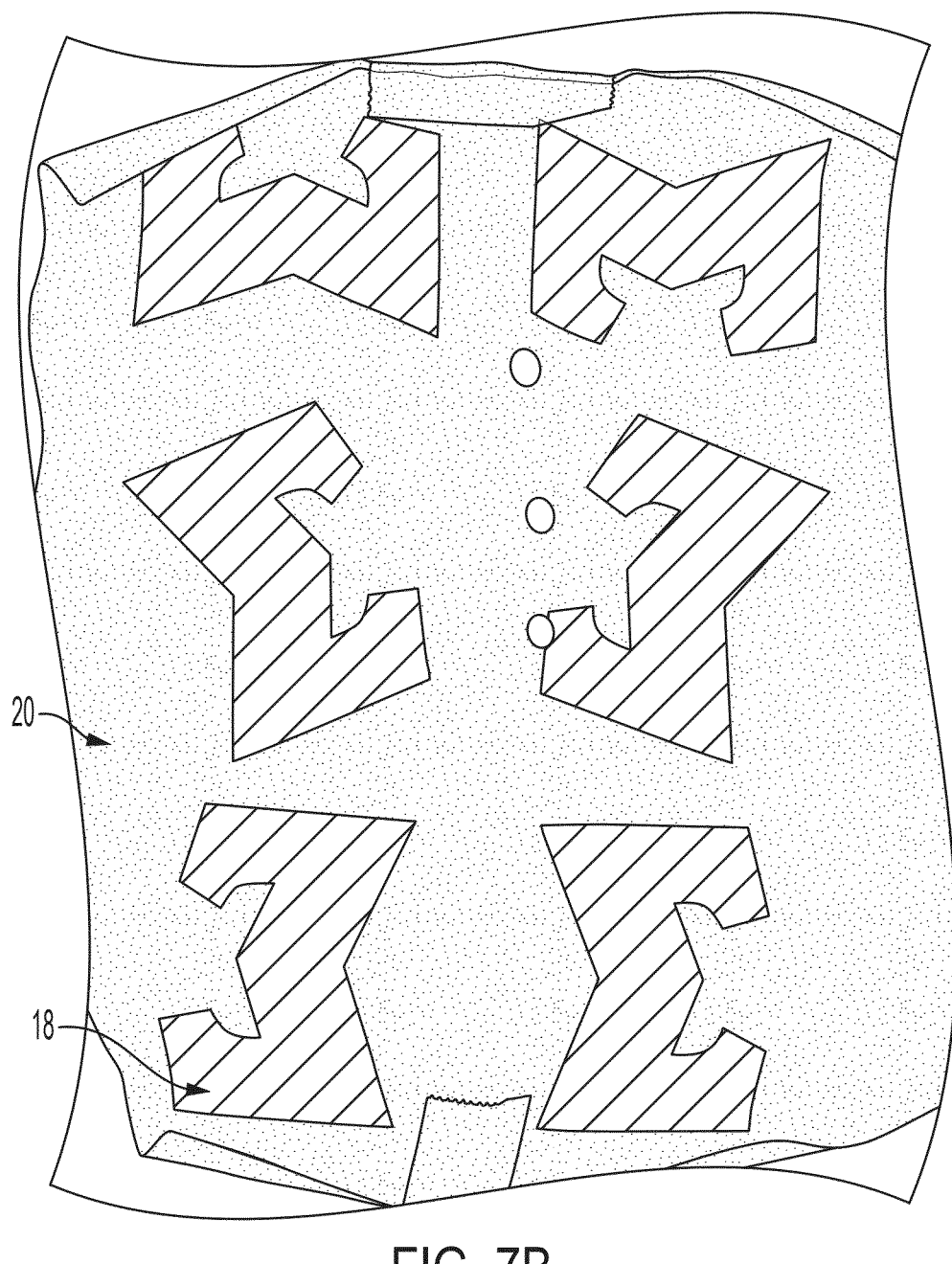
Figure 7C:
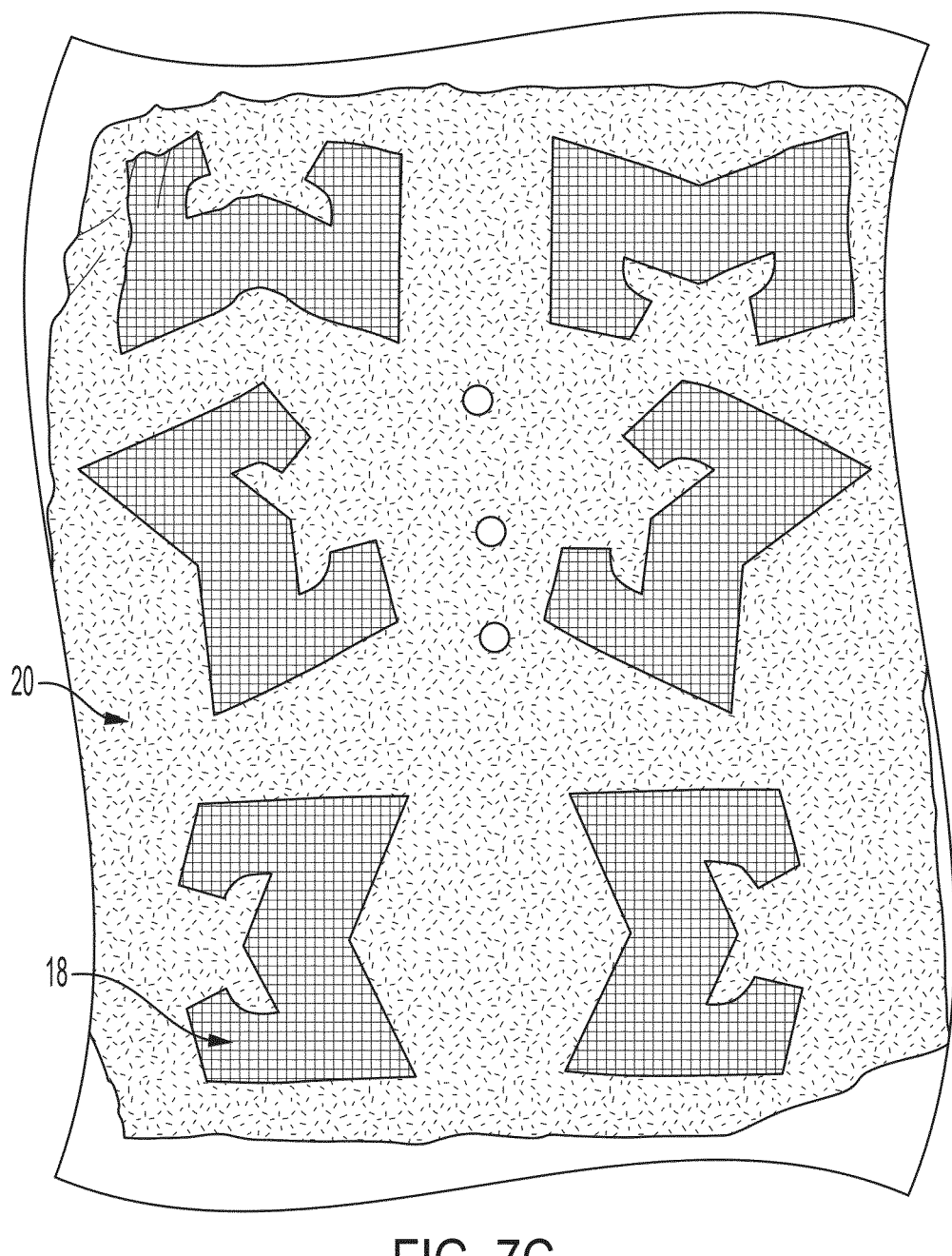

In some embodiments, the laminate is cut to predetermined dimensions, e.g., using dye cutting or laser cutting. In some embodiments, the laminate can be cut into individual shapes/letters to form decals or appliques. In some embodiments, the decals are laminated to a garment fabric, e.g., are heat laminated to the garment fabric. Upon applying the laminate to the fabric the release liner is removed. Examples of the cut laminate, e.g., the decals, applied to a fabric are shown in FIG. 7.

In some embodiments, the first layer is an outer pigmented layer and the second layer is an adhesive layer. In some embodiments, the first layer comprises a polyester or polyether based polyurethane dispersion. In some embodiments, the second layer comprises a polyester based polyurethane and a blocked isocyanate.

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the invention where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. For example, any one or more active agents, additives, ingredients, optional agents, types of organism, disorders, subjects, or combinations thereof, can be excluded.

Where ranges are given herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. It is also understood that where a series of numerical values is stated herein, the invention includes embodiments that relate analogously to any intervening value or range defined by any two values in the series, and that the lowest value may be taken as a minimum and the greatest value may be taken as a maximum. Numerical values, as used herein, include values expressed as percentages. For any embodiment of the invention in which a numerical value is prefaced by "about" or "approximately", the invention includes an embodiment in which the exact value is recited. For any embodiment of the invention in which a numerical value is not prefaced by "about" or "approximately", the invention includes an embodiment in which the value is prefaced by "about" or "approximately".

"Approximately" or "about" generally includes numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value). It should be understood that, unless clearly indicated to the contrary, in any methods claimed herein that include more than one act, the order of the acts of the method is not necessarily limited to the order in which the acts of the method are recited, but the invention includes embodiments in which the order is so limited. It should also be understood that unless otherwise indicated or evident from the context, any product or composition described herein may be considered "isolated".

As used herein the term "comprising" or "comprises" is used in reference to compositions, methods, and respective component(s) thereof, that are essential to the invention, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

It is to be understood that the inventions disclosed herein are not limited in their application to the details set forth in the description or as exemplified. The invention encompasses other embodiments and is capable of being practiced or carried out in various ways. Also, it is to be understood that the phraseology and terminology employed herein is for the purpose of description and should not be regarded as limiting.

While certain compositions and methods of the present invention have been described with specificity in accordance with certain embodiments, the following examples serve only to illustrate the methods and compositions of the invention and are not intended to limit the same.

Exemplification

Example 1

Problem to be Solved

The lettering applied to athletic wear shirts and jerseys can be applied by various means including screen printing and as hot melt "vinyl" decals also known as "Heat Transfer Vinyl". The generic term "vinyl" covers any class of polymer film used including PVC, EVA, and polyurethane. One drawback with these materials is that they are typically thicker and not very flexible which is in contrast to the current trend in athletic wear towards lightweight, flexible and breathable materials. There is a need for lightweight and low-profile lettering with good flexibility which can be readily hot melt applied and can survive the wash.

Another competing technology is "Heat Transfer Printing" which is the technology used to make "Tag-less labels". This technology allows for very thin heat transfer, but the resulting product is not very durable (it cracks and delaminates) after repeated wash/dry cycles.

Proposed Solution

The proposed solution consists of a two-layer laminate prepared via a hot air-dried coating process onto a release liner of one or more water-based polyurethane dispersions (PUD). The first layer applied to the release liner will form the top most or outer layer and will be pigmented as required. The release liner will be chosen to provide a matt texture to the top (outer) layer. This texture enhances the soft feel/touch of the embellishment and further helps prevent blocking of the embellishment (to itself) during wash. This layer will typically be produced from a polyether or polyester based polyurethane and have a high melt temperature to provide good wash and wear resistance. Examples of these materials could be Impranil DL 1554 or DL 1069 supplied by Covestro.

The next layer will be the hot melt adhesive. This will typically be a polyester based polyurethane and will be formulated with the inclusion of a blocked isocyanate. Examples of these materials are NeoRez R605 and Imprafix 2794, respectively. The adhesive PUD must be capable of reacting with an isocyanate and preferably is amine terminated to allow this. Also, the PUD is chosen to provide good flexibility and should be either an amorphous polyester-based PUD or a polyether-based PUD. It could be either aromatic or aliphatic.

The coating process can be done on an air-dry coating line in a single pass with multiple application stations or in multiple passes. The release liner can be silicone coated paper, PET, polypropylene, or any similar material, which may be textured to provide a matt finish to the outer most layer. The drying temperature must be below the de-blocking temperature of the blocked isocyanate if present (which is typically 140-170° C.).

Thickness or Gauge of the Product

The individual layers of the laminate are typically about 0.1-0.3 mil (3-8 micron) for final dry film thickness. This provides a final thickness of the total multi-layered laminate of about 0.5-0.8 mil (15-20 micron). In one example, the total thickness or gauge will be a maximum of 1.25 mil (30 micron). In another example, the thickness will be about 0.5-1.0 mil (12-25 micron). This level of thickness is not generally available commercially for a heat transfer applique because the adhesive layer is so thin it does not give sufficient penetration into fabric to survive multiple washes. The laminates described herein will survive multiple washes because they contain a crosslinker and the stretch and elasticity of the polyurethane polymers chosen for the application reduce the internal force or tension on the adhesive bond. Moreover, the laminate results in a final logo or lettering on a garment that is essentially invisible to the touch and has essentially no profile raised up above the fabric.

The resulting two-layered laminate can be cut to any required dimensions by dye cutting, laser cutting, or using any other cutting techniques known to those of skill in the art. Individual lettering decals can then be heat laminated to the garment fabric and the release liner can be removed. The improved performance relative to commercial materials is provided by the thin nature of the laminate, the stretch/flexible ability, the matt finish, and the thermally cross-linked structure which yields wash resistance.

Modulus of the Product

In order to characterize the softness and elasticity of the product a simple extension test was carried out on an Instron machine, such as depicted in FIG. 4. A fabric with a sample embellishment bonded to the fabric is cut into 1 inch wide strips and subjected to a stretch test. One end of the sample is clamped in the Instron machine, leaving 5 inches of free sample between the clamps. The sample is then stretched to a percentage of its original length. The sample may be held in the extension for several minutes or released immediately. The stretch release is repeated at least three times. In one aspect, the sample is stretched at 100% extension for a specified rate (100% of the sample starting length, typically 5 inches, extends to 10 inches). The sample may then be removed and, with no force on the sample, the length between clamps (which is pre-marked with a pen) is re-measured. If there is no "growth" of the sample, i.e., the length is 5 inches before and after the test, then the percent recovery of the sample is 100%. In one example, a sample measures at 5.1 inches and therefore has grown by 0.1 inches, which is known as the "percent set" (see Table 2).

In addition, the sample may be tested using two tests identified as SF007 (Table 3) and SF0048 (Table 4). Both the SF007 and the SF0048 tests provide modulus data point(s) and a length growth data point. These provide measurements of polymer relaxation or creep (see Table 1).

Regarding test SF007, it is typically run on the bare laminate/embellishment, i.e., no fabric present. The laminate is pulled once out to 100% extension. As it is pulled the modulus is recorded (at 10, 20 30% etc.) all the way to 100%. After release of the sample the length is re-measured. For example, a sample may have an initial length of 127 mm and a final length of 131.75 mm. This means a "growth" after stretch and release of the embellishment sample of 4.75 mm (131.75−127=4.75 mm). The set or percent not regained from the stretch is calculated as 4.75/100=0.037, then multiplied by 100 to obtain 3.7% "set". The recovery of the sample (i.e., how much gained back) is calculated as (0.037-1)*100=96.26 (see Table 3). This would be equivalent to a garment feeling bigger or stretched out after it is worn.

Regarding test SF0048, it is typically measured on the fabric with the laminate/embellishment bonded to it (separate data for the fabric alone). In this test the sample is stretched out to 50% only in 3× stretch-release cycles. In the first 2 cycles it is immediately released on reaching the 50% stretch. In the third cycle it is held at 50% for 10 minutes. During this 10 minute period the modulus is recorded continuously. A percent loss in modulus (which is a relaxation) is quoted, specifically the modulus when it first reaches 50% (start of the 10 minute period) compared with the modulus at the end of the 10 minute period. Finally, the sample is removed from the clamps and its length is compared with the starting length. For example, three embellishments bonded to a fabric may be tested where the embellishments are red, blue, and black. In addition, a tan fabric, such as a nylon spandex, with no embellishment may be used as a control. Cycles 1, 2 and 3 are three pull cycles, where the sample is stretched to 50%. The "lost modulus" provides a comparison of the drop in modulus during the third cycle (comparing Cycle 3 50% with Final). The recovery numbers provided are calculated in a manner similar to those for test SF007, as discussed above.

Figure 2:
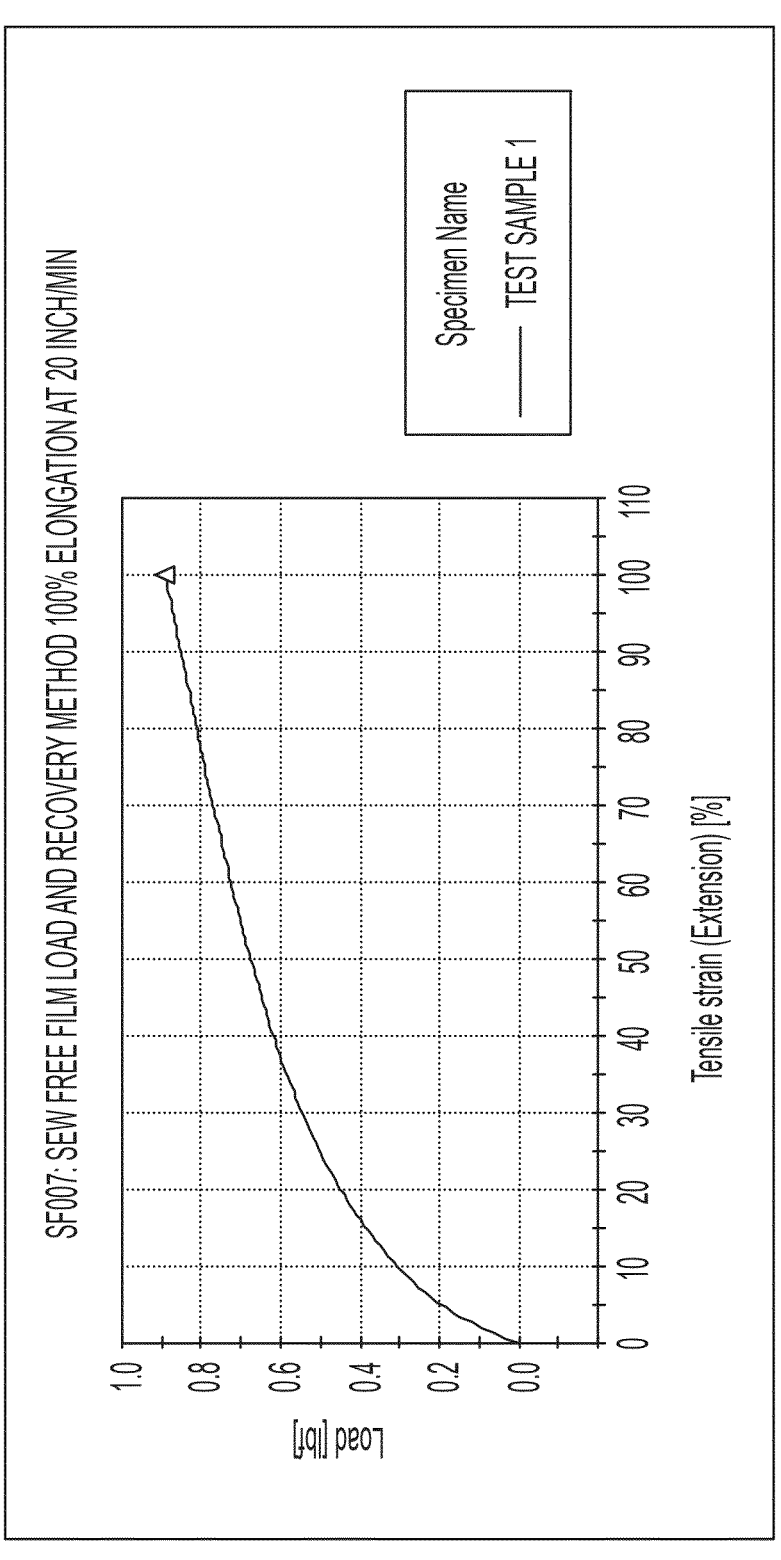
FIG. 2 is a graph showing the load vs strain of Sample 1 tested using an Instron machine.
Figure 3:
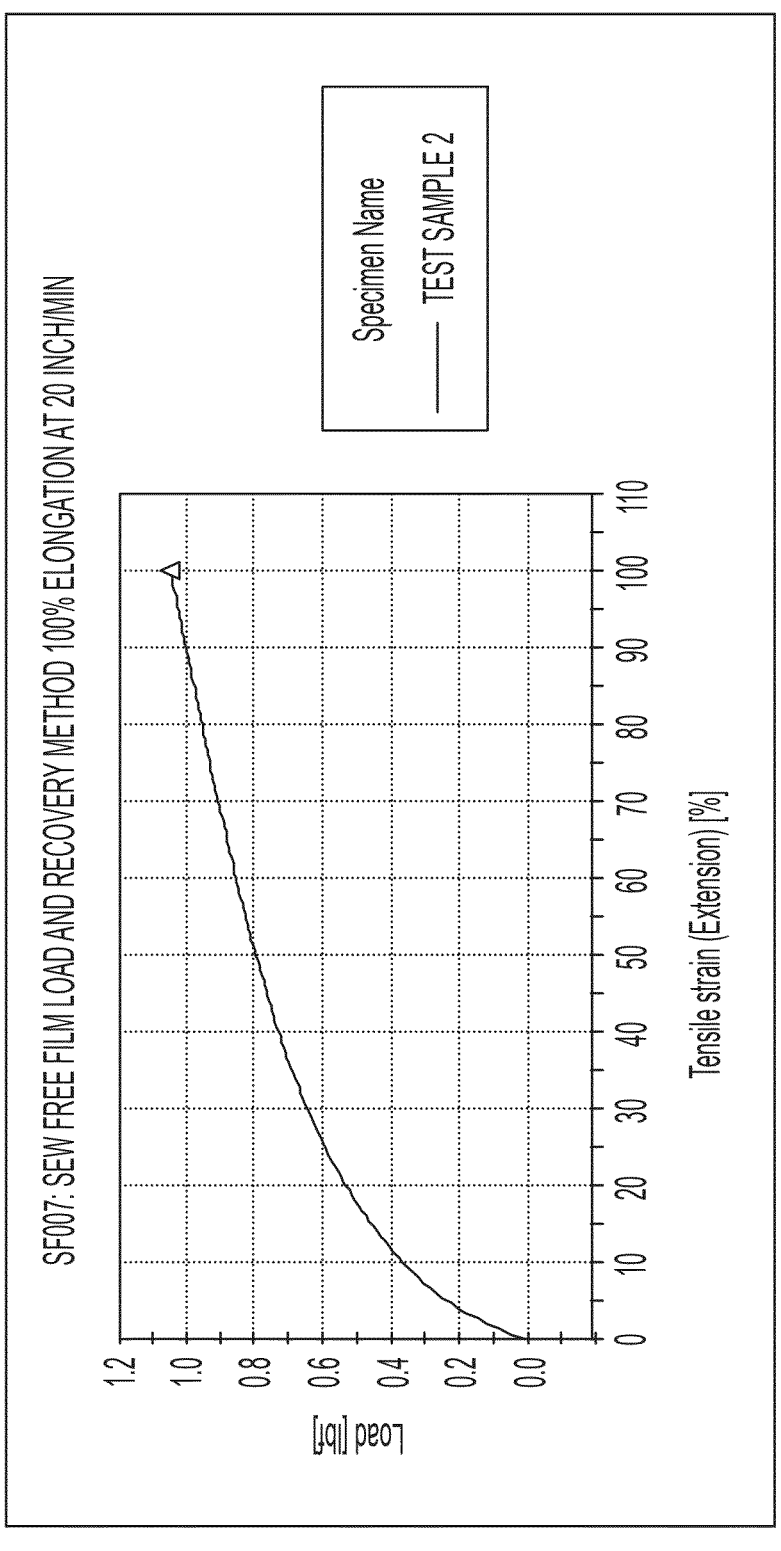
FIG. 3 is a graph showing the load vs strain of Sample 2 tested using an Instron machine.

The software generates a graph plotting load (force) vs strain (FIGS. 2-3). Due to the difficulties in testing very thin samples using this method the displayed sample was 2 mil (50 micron) in thickness. Gauge can also be expressed as grams weight of material per square meter of film (GSM). Two samples of the same material were tested.

Further, the sample has been chemically cross-linked by heating past the de-blocking temperature of the blocked isocyanate for 15 seconds (150° C.) in a heat press. This provides the mechanical performance of the final product after it has been applied to a textile. However, it is the "free film", without the textile, that is being tested.

TABLE 1

| | Specimen label | Load at 10% [lbf] | Load at 15% [lbf] | Load at 20% [lbf] |
|---|---|---|---|---|
| | SAMPLE 1 | 0.3055 | 0.3857 | 0.4490 |
| | SAMPLE 2 | 0.3604 | 0.4546 | 0.5304 |
| Mean | | 0.3330 | 0.4202 | 0.4897 |
| Minimum | | 0.3055 | 0.3857 | 0.4490 |
| Maximum | | 0.3604 | 0.4546 | 0.5304 |

| | Load at 30% [lbf] | Load at 40% [lbf] | Load at 50% [lbf] | Load at 60% [lbf] |
|---|---|---|---|---|
| Sample 1 | 0.5450 | 0.6187 | 0.6762 | 0.7270 |
| Sample 2 | 0.6416 | 0.7258 | 0.7958 | 0.8542 |
| Mean | 0.5933 | 0.6723 | 0.7360 | 0.7906 |
| Minimum | 0.5450 | 0.6187 | 0.6762 | 0.7270 |
| Maximum | 0.6416 | 0.7258 | 0.7958 | 0.8542 |

| | Load at 70% [lbf] | Load at 80% [lbf] | Load at 90% [lbf] | Load at 100% [lbf] |
|---|---|---|---|---|
| Sample 1 | 0.7710 | 0.8115 | 0.8530 | 0.8922 |
| Sample 2 | 0.9075 | 0.9587 | 1.0034 | 1.0507 |
| Mean | 0.8393 | 0.8851 | 0.9282 | 0.9714 |
| Minimum | 0.7710 | 0.8115 | 0.8530 | 0.8922 |
| Maximum | 0.9075 | 0.9587 | 1.0034 | 1.0507 |

TABLE 2

| | Comment |
|---|---|
| Sample 1 | 131.75, 65 GSM, 96.25% recovery |
| Sample 2 | 131.75, 69 GSM, 96.26% |
| Mean | |
| Minimum | |
| Maximum | |

TABLE 3

SF007 (100% Stretch and Recovery) on Cured PUD Film

| Film | Gauge (mil) | 10% (lbf) | 15% (lbf) | 20% (lbf) | 30% (lbf) | 40% (lbf) | 50% (lbf) | 60% (lbf) | 70% (lbf) | 80% (lbf) | 90% (lbf) | 100% (lbf) | Initial (mm) | Final (mm) | Rec. (%) |
|---|---|---|---|---|---|---|---|---|---|---|---|---|---|---|---|
| BLK PUD | 2.15 | 0.306 | 0.386 | 0.449 | 0.545 | 0.619 | 0.676 | 0.727 | 0.771 | 0.812 | 0.853 | 0.892 | 127.00 | 131.75 | 96.26 |
| BLK PUD | 2.30 | 0.360 | 0.455 | 0.530 | 0.642 | 0.726 | 0.796 | 0.854 | 0.908 | 0.959 | 1.003 | 1.051 | 127.00 | 131.75 | 96.26 |
| BLK PUD | 2.23 | 0.333 | 0.420 | 0.490 | 0.593 | 0.672 | 0.736 | 0.791 | 0.839 | 0.885 | 0.928 | 0.971 | 127.00 | 131.75 | 96.26 |

SF0048 (Loss in Modulus) for PUD Samples and Fabric

| Film | Fab. | Dir. | Gauge mil | CY1 50% lbf | Cy2 50% lbf | Cy3 50% lbf | Final lbf | Modulus (%) | Int. (mm) | Final (mm) | Rec. (%) |
|---|---|---|---|---|---|---|---|---|---|---|---|
| Red PUD/Fab | Tan | MD | 0.65 | 0.4248 | 0.3975 | 0.3839 | 0.2359 | 38.5570 | 127.00 | 136.00 | 92.91 |
| Red PUD/Fab | Tan | MD | 0.65 | 0.4706 | 0.4374 | 0.4211 | 0.2422 | 42.4842 | 127.00 | 137.50 | 91.73 |
| Red PUD/Fab | Tan | MD | 0.65 | 0.5569 | 0.5122 | 0.4923 | 0.2815 | 42.8319 | 127.00 | 138.00 | 91.34 |
| Red PUD/Fab | Tan | MD | 0.65 | 0.4841 | 0.4490 | 0.4324 | 0.2532 | 41.2910 | 127.00 | 137.17 | 91.99 |
| Blu PUD/Fab | Tan | MD | 0.30 | 0.6170 | 0.5454 | 0.5117 | 0.2153 | 57.9323 | 127.00 | 140.50 | 89.37 |
| Blu PUD/Fab | Tan | MD | 0.30 | 0.5587 | 0.4970 | 0.4704 | 0.2193 | 53.3746 | 127.00 | 139.50 | 90.16 |
| Blu PUD/Fab | Tan | MD | 0.30 | 0.5879 | 0.5212 | 0.4911 | 0.2173 | 55.6534 | 127.00 | 140.00 | 89.76 |
| Blk PUD Film | NA | MD | 2.00 | 0.6155 | 0.5546 | 0.5244 | 0.2051 | 60.8875 | 127.00 | 141.50 | 88.58 |
| Blk PUD Film | NA | MD | 2.00 | 0.6155 | 0.5546 | 0.5244 | 0.2051 | 60.8875 | 127.00 | 141.50 | 88.58 |
| Tan Fabric | Tan | MD | NA | 0.1785 | 0.1725 | 0.1707 | 0.1365 | 20.0192 | 127.00 | 130.00 | 97.64 |

-continued

| | | | | | | | | | | | |
|---|---|---|---|---|---|---|---|---|---|---|---|
| SF0048 (Loss in Modulus) for PUD Samples and Fabric | | | | | | | | | | | |
| Film ID | | | | Modulus @ 50% Elongation | | | | Lost Mod. | | Recovery | |
| Film | Fab. | Dir. | Gauge mil | CY1 50% lbf | Cy2 50% lbf | Cy3 50% lbf | Final lbf | Modulus (%) | Int. (mm) | Final (mm) | Rec. (%) |
| Tan Fabric | Tan | MD | NA | 0.1912 | 0.1857 | 0.1820 | 0.1448 | 20.4342 | 127.00 | 130.25 | 97.44 |
| Tan Fabric | Tan | MD | NA | 0.1902 | 0.1847 | 0.1807 | 0.1518 | 15.0244 | 127.00 | 130.75 | 97.05 |
| Tan Fabric | Tan | MD | NA | 0.1866 | 0.1810 | 0.1778 | 0.1444 | 18.8259 | 127.00 | 130.33 | 97.38 |
| Tan Fabric | Tan | TD | NA | 0.4597 | 0.4387 | 0.4276 | 0.3147 | 26.4043 | 127.00 | 131.75 | 96.26 |
| Tan Fabric | Tan | TD | NA | 0.4561 | 0.4342 | 0.4248 | 0.3117 | 25.6211 | 127.00 | 132.50 | 95.67 |
| Tan Fabric | Tan | TD | NA | 0.4565 | 0.4347 | 0.4244 | 0.3254 | 23.3415 | 127.00 | 132.25 | 95.87 |
| Tan Fabric | Tan | TD | NA | 0.4574 | 0.4359 | 0.4256 | 0.3173 | 25.4556 | 127.00 | 132.17 | 95.93 |

Example 2

Multiple rounds of bonding and wash testing of the first prototype fabrics with laminate embellishments were completed. Specifically, three sample batches of black, red, and white pigmented films were bonded. A set of five different fabrics were used covering the range of very flexible (nylon-Spandex) to rip-stop nylon baffle fabric as used in baffle jackets. To complete the bonding, a procedure of bonding at set temperatures of the heat press of either 135, 150, 165, or 175° C., 60 psi, 20 seconds, was used. Then the matt textured, Coveme PET liner was removed. In some cases, a second embellishment was bonded on top of the first (so-called "letter on letter"). To complete this the first embellishment was bonded as described, then a second (smaller) letter was bonded on top (a smaller letter was chosen to provide overlap of the first letter). Sample letters were placed at angles of 0, 45 & 90 to the direction of the warp of the fabric.

These samples were left overnight followed by a series of 25 wash/dry cycles. The wash was performed at 60° C. and the dry was performed at "high" temperature settings. Following this, the samples were visually examined for signs of "lifting" off the fabric, delamination (the barrier layer separating from the adhesive) layer or "cracking" or splitting of the micro-embellishment.

The results were as follows: for the higher temperature bonded samples (165° C. and above) the micro-embellishments survived the wash without lifting/delamination or cracking. Under a bonding temperature of 150° C. there was considerable cracking and delamination. At the intermediate temperature of 150° C. it was found that some failures might be seen for the white pigment, but less so for the red and not at all for the black. This could be resolved by increasing the bonding hold time to 40 or 60 seconds. The result may be due to the differences in resin/pigment ratio of the three different materials. The white samples contained the highest level of pigment (30% by weight) in order to give a desired level of hiding. The red was 15%, again to give sufficient hiding, and the black was 5% for the same reason. It is thought that when the micro-embellishment is heat bonded there is some chemical cross-linking of the isocyanate crosslinker across the boundary of the adhesive layer (second layer) and barrier layer (first layer) which gives resistance to cracking. Therefore, as the level of resin drops 95-85-75 (black-red-white) there is less adhesive in the micro-embellishment and the strength of the micro-embellishment is reduced. If the thermal curing process is only partially complete, then the stresses of the wash cycles cause damage to the bonded piece. It is also known that without crosslinking the embellishments will be partially dissolved by common solvents such as acetone or MEK, while following cure they are resistant to solvent attack.

Finally, it was also found that if a crosslinker is added to the barrier layer as well as to the adhesive layer, then this can have a deleterious effect on the performance during wash. Specifically, at levels of 2, 5 and 10% by weight of added crosslinker to the barrier layer then during the wash cycles cracking and delamination of the two layers was observed. It is assumed that if there is crosslinker in the barrier layer it can react within the layer and inhibit chemical crosslinking across the boundary with the adhesive layer.

Example 3

Objective and Background

This project was initiated in order to produce samples of 2-layer polyurethane (PU) color barrier/adhesive film in a 24″ wide roll to roll process. Another goal was to produce samples of only the adhesive layer on supplied Coveme and Polypropylene films. Consistent adhesive coatings were also desired for testing and distributing the developmental product.

TABLE 5

| | | | | | | |
|---|---|---|---|---|---|---|
| Trial Plan: Trial Plan | | | | | | |
| Name of Layer | Formulation | Gravure # | Web | Temp (F.) | Speed (fpm) | Footage (feet) |
| White layer | 25% solid | 45th | Coveme 52U | 170/200/230 | 20 web; | 1000 |
| Black layer | 5% solid | 45th (alt 35th) | Coveme 52U | | 24 cylinder | 1000 |
| Red layer | 15% solid | 45th | Coveme 52U | | | 1000 |
| Adhesive 1 only | Adwel/180 = 95:5 (dry 49% solid) | 45th (or 35th) | Coveme 52U | 140/125/125 | 15 web; 18 cylinder | 200 |

TABLE 5-continued

| | | | Trial Plan: Trial Plan | | | |
|---|---|---|---|---|---|---|
| Name of Layer | Formulation | Gravure # | Web | Temp (F.) | Speed (fpm) | Footage (feet) |
| Adhesive 2 only | 6011/DHT = 85:15 (dry 31.5% solid) | 24th (or 12th) | Coveme 52U | 140/125/125 | 15 web; 18 cylinder | |
| Adhesive 1 on coated white | Adwel/180 = 95:5 (dry 49% solid) | 45th (or 35th) | White/Coveme 52U | 140/125/125 | 15 web; 18 cylinder | 300 (can be shorter) |
| Adhesive 1 on coated black | | 45th (or 35th) | Black/Coveme 52U | | | |
| Adhesive 1 on coated red | | 45th (or 35th) | Red/Coveme 52U | | | |
| Adhesive 2 on coated white | 6011/DHT = 85:15 (dry 31.5% solid) | 24th (or 12th) | White/Coveme 52U | 140/125/125 | 15 web; 18 cylinder | |
| Adhesive 2 on coated black | | 24th (or 12th) | Black/Coveme 52U | | | |
| Adhesive 2 on coated red | | 24th (or 12th) | Red/Coveme 52U | | | |
| Adhesive 1 only | Adwel/180 = 95:5 (dry 49% solid) | 45th (or 35th) | PP liner | 140/125/125 | 15 web; 18 cylinder | 200 |
| Adhesive 2 only | 6011/DHT = 85:15 (dry 31.5% solid) | 12th (or 24th) | PP liner | 140/125/125 | 15 web; 18 cylinder | 200 |
| | | | Optional rolls (good to have if time permits) | | | |
| White layer | 25% solid | 45th | PP liner | 170/200/230 | 20 web; 24 cylinder | 500 |
| Black layer | 5% solid | 45th | | | | 500 |
| Red layer | 15% solid | 45th | | | | 500 |
| Adhesive 1 on coated white | Adwel/180 = 95:5 (dry 49% solid) | 45th (or 35th) | White/PP liner | 140/125/125 | 15 web; 18 cylinder | 150 |
| Adhesive 1 on coated black | | 45th (or 35th) | Black/PP liner | | | 150 |
| Adhesive 1 on coated red | | 45th (or 35th) | Red/PP liner | | | 150 |
| Adhesive 2 on coated white | | 24th (or 12th) | White/PP liner | 140/125/125 | 15 web; 18 cylinder | 150 |

Materials

1. Coveme Kemafoil KTR TXS 52U 2-sided matte release film, nominal 75 micron, Lot U22F097-02, 20" wide, approximately 11,844 square feet
2. RS Liner PP, MG-100F, 4 mil, 19.48" wide, non-corona treated, approx. 9,600 ft
3. Coating P. WD-6011W adhesive, Lot 10104393, 2×20 kg
4. Adwel 1665 adhesive, Lot 09221348 PU, 310 lbs
5. Impranil DL 1554, batch C42280012, 31×1 kg bottles
6. Aqualink 180, batch 22SA161, 10 kgs
7. Aqualink DHT, batch 53541, 10 kgs
8. Clariant Colanyl Black N 530-MX, Lot MX1B021465, 3×1 pt.
9. Clariant Colanyl White R 530-MX, Lot MX1B019292, 18×1 pt.
10. Clariant Colanyl Red D3GD 532, Lot 9DE1015908, 10×100 g
11. Jeffamine T403, 5521-C1A1, 7 lbs
12. Acrysol ASE 60, 5 lbs
13. Laboratory deionized water
14. Plastic pails
15. Nominal 55 micron polyamide bag filters Pre-Trial Lab Work:

Color and adhesive mixtures were coated on potential liners to verify compatibility. The coating formulations for the mixtures were (in parts by weight):

Red: 77.3 parts Impranil DL 1554, 13.6 parts Clariant Colanyl Red 532, and 9.1 parts deionized water Black: 86.4 parts Impranil DL 1554, 4.5 parts Clariant Colanyl Black N 530, and 9.1 parts deionized water White: 75 parts Impranil DL 1554 and 25 parts Clariant Colanyl White R 530

Adhesive 1:94.8 parts Adwel 1665, 5 parts Aqualink 180, and 0.1 part each of Jeffamine T403 and ASE060 thickener Adhesive 2:84.8 parts WD 6011 adhesive, 15 parts Aqualink DHT, and 0.1 part each of Jeffamine T403 and ASE060 thickener The major findings based on the lab work:

It was demonstrated that the color layers coated well with Mayer rod on polypropylene film and on the Coveme film. After drying, the layers could be removed from the Coveme or PP film without difficulty.

The adhesive layers coated without defects near the requested coat weight on the red, black and white urethane color layers. The adhesives were also compatible with the polypropylene and Coveme films. After drying, the layers could be removed from the Coveme or PP film without difficulty or separation of the layers.

FTIR indicated that Adhesive 1 and Adhesive 2 layers did not lose their ability to cure after additional oven exposure for 15 minutes at 45° C. or after additional exposure to higher temperatures. This was determined by following the isocyanate chemical group absorption. The following two graphs depict isocyanate absorption of dried Adhesives 1 and 2 after 15 minutes exposure to 90° C., 110° C. and 130° C. Absorption of Adhesive 1 is smaller than Adhesive 2 because it only contains 5% isocyanate. These results bode well for retention of the B-stage adhesive cure mechanism until application to the final fabric surface.

Viscosity measurements were performed to characterize adhesive coatings to be prepared for the coating trial. Deionized water was added to the original black and red formulations to bring their viscosities in line with the requirements of the gravure cylinder coating process. Adhesive viscosities were measured and re-measured to insure stability of the mixtures for a couple of days following compounding.

TABLE 6

Mixture Viscosities

| | Viscometer Spindle | RPM | % of Scale | cps |
|---|---|---|---|---|
| Original black | #3 | 10 | 41.6 | 4160 |
| Original black + 10% H2O | #3 | 50 | 13.7 | 274 |
| Original red | #3 | 10 | 32.4 | 3220 |
| Original red + H2O | #3 | 50 | 12 | 240 |
| Original white | #3 | 20 | 10.5 | 530 |
| Adhesive 1 mixed 11/16 | #3 | 50 | 6.7 | 134 |
| Adhesive 1 remixed 11/21 | #3 | 50 | 7.4 | 480 |
| Adhesive 1 mixed 11/21, roll overnight | #3 | 50 | 7.9 | 150 |
| Adhesive 1 mixed 11/21, roll 15 min | #3 | 50 | 8.1 | 158 |
| Adhesive 1 mixed 11/21, retest 11/28 | #3 | 50 | — | 154 |
| Adhesive 2 mixed 11/16 | #3 | 50 | 37.7 | 754 |
| Adhesive 2 mixed 11/21 | #3 | 50 | 36.2 | 726 |
| Adhesive 2 mixed 11/21, roll overnight | #3 | 50 | 35 | 700 |
| Adhesive 2 mixed 11/21, roll 15 min | #3 | 50 | 37.2 | 744 |
| Adhesive 2 mixed 11/21, retest 11/28 | #3 | 50 | 36 | 716 |

Coating Mixtures Compounding

Trial coating compounding batches was carried out. Mixing was carried out in HDPE pails using a 3" diameter propeller blade.

Impranil in the color/barrier mixtures and Adwel 1665 and WO 6011 in the adhesive mixtures were filtered through nominal 55 micron polyamide bag filters using gravity filtration.

The color/barrier mixtures and the adhesive mixtures were allowed to dwell overnight prior to coating. Mixtures were re-stirred for a couple of minutes prior to being poured into the coater reservoir.

Trial Results and Discussion

Reverse gravure coating proved suitable for color and adhesive layers. Dilution of the red and black layers with 10 wt % water improved gravure coating quality compared to a previous trial and avoided drying on and/or clogging the cylinder cells. White was lower viscosity than red or black and coated well without dilution. A higher white coat weight was targeted to ensure that that color layer was of sufficient thickness for good appearance.

Some defects were present in coated layers including occasional pinholes or spot defects. Tiny bubbles from entrapped air, particles in the coating mixture or on the liner, slight foaming in the gravure pan, and/or particles on the gravure cylinder could have contributed to defects.

Adhesive was successfully coated directly to both the Coveme and PP films in order for both options to be evaluated for liners.

To evaluate the 2-layer material which was produced, some sections of each color were laminated to a provided nylon substrate. Hotronix STX Clamshell heat press operating conditions were 6-8 pressure, 136° C. and 23 seconds. The films transferred well, with clean edges and uniform appearance. The Coveme release liner removed easily from small transfers.

TABLE 7

List of trail products

| Packing List No. | Feet | Coatings | Gravure | Coating Thickness (mils) |
|---|---|---|---|---|
| 102868-01 | 200 | White | 35$^{th}$ | 1.0 |
| 102868-01A | 260 | Adh 1 on white | 24$^{th}$ | 1.2 |
| 102868-01B | 220 | Adh 2 on white | 24$^{th}$ | 0.7 |
| 102868-02 | 260 | Black | 35$^{th}$ | 0.9 |
| 102868-02A | 298 | Adh 1 on black | 24$^{th}$ | 1.1 |
| 102868-02B | 230 | Adh 2 on black | 24$^{th}$ | 0.7 |
| 102868-03 | 200 | Red | 35$^{th}$ | 0.9 |
| 102868-03A | 300 | Adh 1 on red | 24$^{th}$ | 1.3 |
| 102868-03B | 210 | Adh 2 on red | 24$^{th}$ | 0.7 |
| 102868-04 | 150 | Adh 1 on Coveme | 35$^{th}$ | 0.7 |
| 102868-05 | 148 | Adh 1 on PP | 35$^{th}$ | 0.7 |
| 102868-06 | 148 | Adh 2 on Coveme | 12$^{th}$ | 1.0 |

Conclusions

Observations and Measured Results Compared to Objectives/Requirements

The trial targets of proving continuous coating feasibility and preparing many feet of trial material for each of three 2-layer products and for adhesive at two thicknesses were achieved.

Reverse gravure coating produces trial product with relatively uniform appearance. However, the level of defects will still have to be evaluated, and process or formulation improvements may be needed to allow for defect-free continuous coating.

In a continuous Gravure or Mayer rod coating operation, residue can build on the cylinder or rod, and the solids content of coating mixtures can change over time.

This may limit the maximum length of a coating run before periodic cleaning and would be important to investigate when scaling to production.

Example 4

Objective

To understand at what temperature adhesive 1 (Adwel 1665+Aqualink 180) and adhesive 2 (WD 6011+Aqualink DHT) will crosslink.

Experimental (1) FT-IR condition 4000-650 cm$^{-1}$; Scan number 8; Resolution 2 cm$^{-1}$ (2) Both Adhesive 1 and 2 were mixed according to compounding sheets. They were dried at 50° C., 70° C., 90° C., 110 and 130° C. for 10 minutes each.

Note: The samples dried at 50° C., 70° C. and 90° C. were the adhesives film cast on liner only (FIGS. 11 and 14). The samples dried at 90° C., 110° C. and 130° C. were adhesive film cast on white color barrier layer.

Summary (1) For Adhesive 1 (Adwel 1665+Aqualink 180), the isocyanate (~2,260) peak is small due to there is only 5% in the formulation. After 90° C. 10 minutes in FIG. 11, the peak still remained. This indicates the isocyanate was still in the formulation.

(2) FIGS. 12 and 13 showed isocyanate disappeared after 110° C. 10 minutes in Adhesive 1 system. It was also noticed that CO2 absorption (2,320 cm-1) showed up. It is not clear this CO2 absorption was from background noises or isocyanate reacted with water.

(3) For Adhesive 2 (WD 6011+Aqualink DHT), the isocyanate (~2,260) peak is obvious due to there is 15% in the formulation. After 90° C. 10 minutes in FIG. 14, the peak still remained. This indicates the isocyanate was still in the formulation.

(4) FIGS. 15 and 16 showed isocyanate decreased after 110° C. 10 minutes in Adhesive 2 system. There was still small amount of isocyanate left even after 110° C. drying. It was also noticed that CO2 absorption (2,320 cm-1) showed up. It is not clear this CO2 absorption was from background noises or isocyanate reacted with water.

What is claimed is:

1. A laminate comprising:
   a first layer deposited on a release liner, wherein the first layer comprises a polyether or polyester based polyurethane; and
   a second layer deposited on the first layer, wherein the second layer comprises a polyester or polyether based polyurethane in combination with a blocked or encapsulated isocyanate, wherein the blocked or encapsulated isocyanate is based on isophorone diisocyanate (IPDI) trimer or toluene diisocyanate (TDI) dimer.

2. The laminate of claim 1, wherein the release liner comprises a matt texture.

3. The laminate of claim 1, wherein the first layer comprises a pigment.

4. The laminate of claim 1, wherein the first layer comprises a polyether based polyurethane or a polyester based polyurethane.

5. The laminate of claim 1, wherein the first layer comprises an aliphatic polyurethane dispersion.

6. The laminate of claim 1, wherein the second layer comprises an amine terminated polyurethane dispersion.

7. The laminate of claim 1, wherein the second layer comprises an amorphous polyester based polyurethane dispersion, a polyether based polyurethane dispersion, an aromatic polyurethane dispersion, and/or an aliphatic polyurethane dispersion.

8. The laminate of claim 1, wherein the second layer comprises an amine terminated polyurethane and a blocked isocyanate or an amine terminated polyurethane and an encapsulated isocyanate.

9. The laminate of claim 1, wherein the laminate has a thickness of less than 1.25 mil.

10. The laminate of claim 1, wherein the first layer and/or the second layer has a thickness of about 0.1-0.3 mil.

11. The laminate of claim 1, wherein the laminate exhibits a load of about 0.1-0.3 lb/f.

12. The laminate of claim 1, further comprising a third layer located between the first layer and the second layer.

* * * * *